United States Patent [19]
Redlich et al.

[11] Patent Number: 5,745,055
[45] Date of Patent: Apr. 28, 1998

[54] FOOT-OPERATED MULTI-DIRECTIONAL SENSING DEVICE

[75] Inventors: Sanford I. Redlich; Jacqueline H. Heller, both of Portland, Oreg.

[73] Assignee: Fleetfoot, L.L.C., San Franisco, Calif.

[21] Appl. No.: 485,476

[22] Filed: Jun. 7, 1995

[51] Int. Cl.$^6$ ................................................ H03K 17/94
[52] U.S. Cl. .......................... 341/20; 341/21; 341/22; 345/156; 345/157; 345/163; 400/273
[58] Field of Search ................... 341/20–22; 340/407.2; 345/156, 157, 160, 163, 167; 400/273, 475; 273/148 B; 463/36, 37

[56] References Cited

U.S. PATENT DOCUMENTS

| | | | |
|---|---|---|---|
| 3,541,541 | 11/1970 | Englebart | 340/324 |
| 4,464,652 | 8/1984 | Lapson et al. | 340/710 |
| 4,488,017 | 12/1984 | Lee | 200/5 R |
| 4,562,347 | 12/1985 | Hovey et al. | 250/221 |
| 4,628,755 | 12/1986 | Hawley | 74/471 |
| 4,712,101 | 12/1987 | Culver | 340/710 |
| 4,720,789 | 1/1988 | Hector et al. | 364/410 |
| 4,786,892 | 11/1988 | Kubo et al. | 340/365 R |
| 4,817,950 | 4/1989 | Goo | 273/148 B |
| 4,939,508 | 7/1990 | Lawrence et al. | 340/710 |
| 5,019,806 | 5/1991 | Raskin et al. | 340/706 |
| 5,063,289 | 11/1991 | Jasinksi et al. | 250/221 |
| 5,139,261 | 8/1992 | Openiano | 273/148 B |
| 5,148,152 | 9/1992 | Stueckle et al. | 340/706 |
| 5,171,978 | 12/1992 | Mimlitch et al. | 250/221 |
| 5,181,181 | 1/1993 | Glynn | 364/566 |
| 5,280,276 | 1/1994 | Kwok | 345/167 |
| 5,283,555 | 2/1994 | Ward et al. | 345/156 |
| 5,287,089 | 2/1994 | Parsons | 345/156 |
| 5,287,090 | 2/1994 | Grant | 345/163 |
| 5,334,997 | 8/1994 | Scallon | 345/167 |
| 5,552,807 | 9/1996 | Hayes et al. | 345/156 |

FOREIGN PATENT DOCUMENTS

| | | |
|---|---|---|
| 2654233 | 5/1991 | France . |
| 4028075 | 3/1992 | Germany . |
| 4035273 | 5/1992 | Germany . |
| 9200971 U | 5/1992 | Germany . |
| 91120527 | 1/1993 | Germany . |
| 93085834 | 7/1994 | Germany . |
| 2188711 | 10/1987 | United Kingdom . |
| WO8403051 | 8/1984 | WIPO . |
| WO9534872 | 12/1995 | WIPO . |

OTHER PUBLICATIONS

Sandberg-Dimet, Erik, "New 'Mouse' Resides on the Floor" New York Times, Feb. 12, 1985, one page.

Pearson et al., "Of Moles and Men: The Design of Foot Controls for Workstations", Human Factors in Computing Systems, CHI'86 Conference Proceedings, 1986, pp. 333–339.

Rosch, Winn L., "Input Device" The Winn Rosch Hardware Bible, 1989, pp. 256–264.

Japanese Patent Abstract, vol. 13, No. 141 (P–853), Publication No. JP63307523, Publication Date 1988, p. 1.

IBM Technical Disclosure Bulletin, vol. 28, No. 11, Apr. 1986, "Foot-Operated Mouse."

*Primary Examiner*—Jeffery Hofsass
*Assistant Examiner*—Ashok Mannava
*Attorney, Agent, or Firm*—Christie, Parker & Hale, LLP

[57] ABSTRACT

A device for inputting information to a remote computer. The device includes a housing having a base for resting in a support surface and an oppositely facing platform of a size and shape for receiving and supporting the foot of a user. The device further includes sensing means for sensing movement of the foot and for producing motion information indicative of the movement for the computer. The device further includes a switch and a switch actuation surface, the surface facing away from the support surface for engagement with the foot when the foot is supported by the platform.

25 Claims, 28 Drawing Sheets

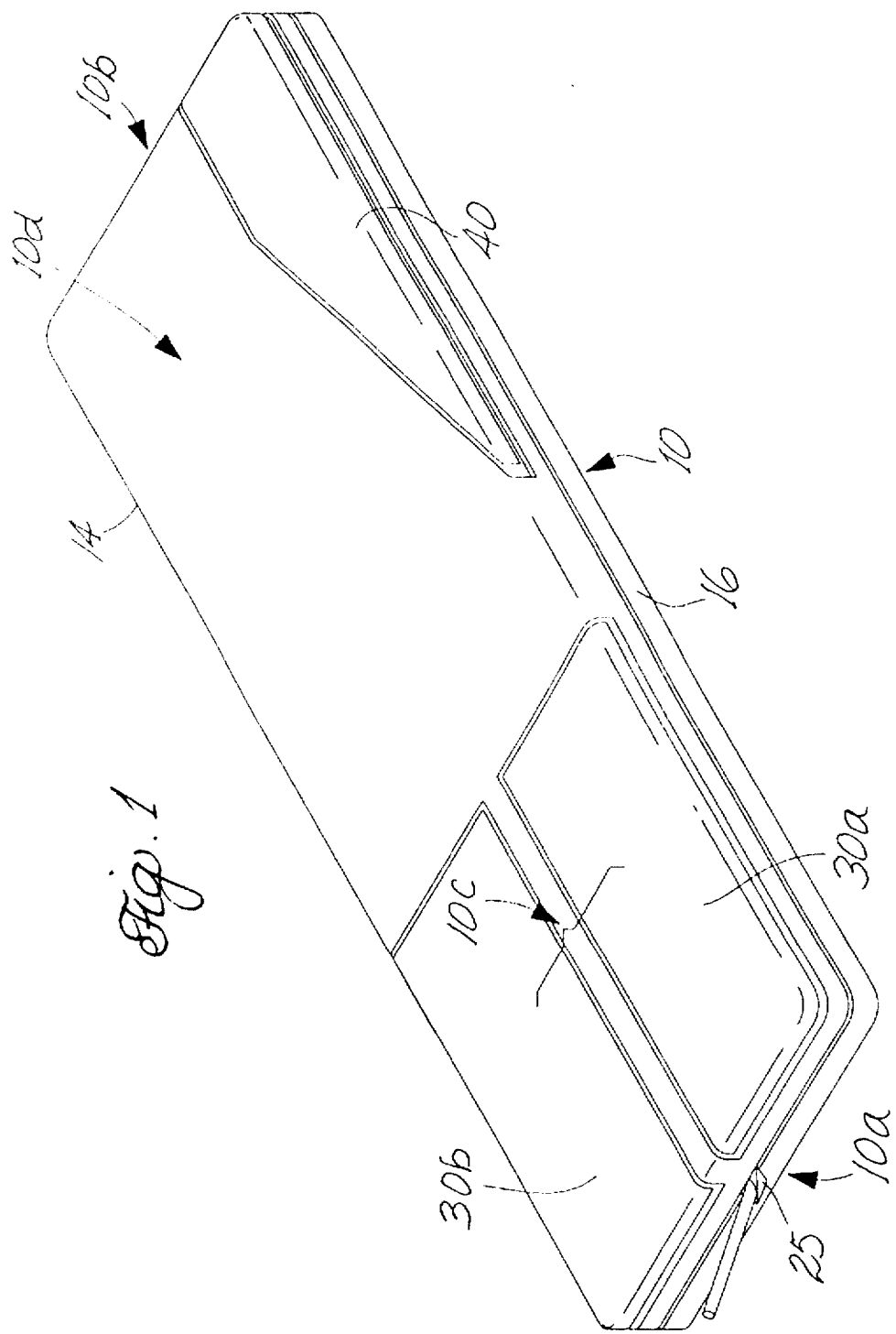

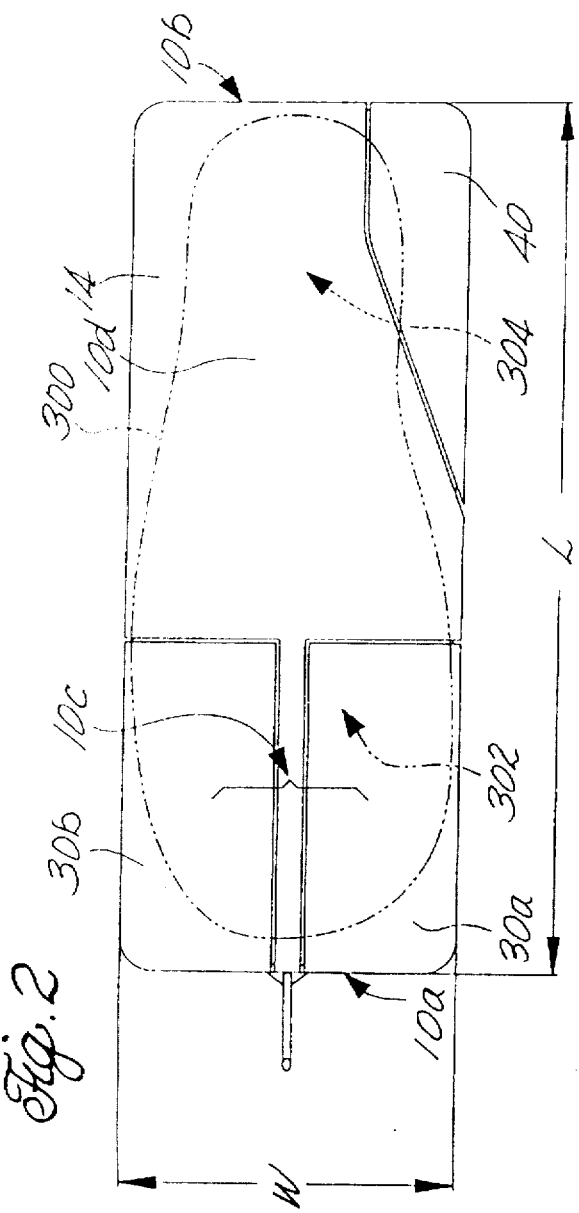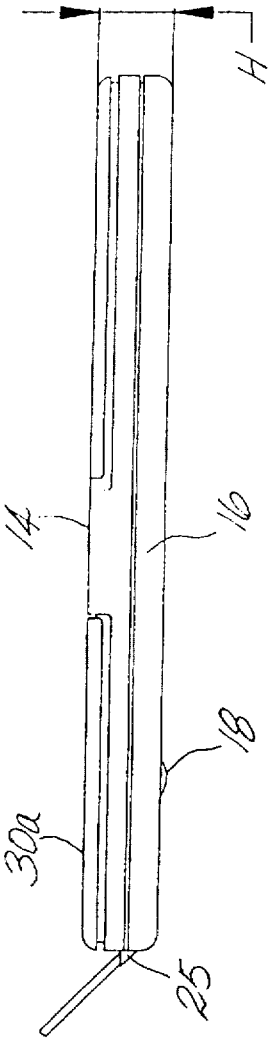

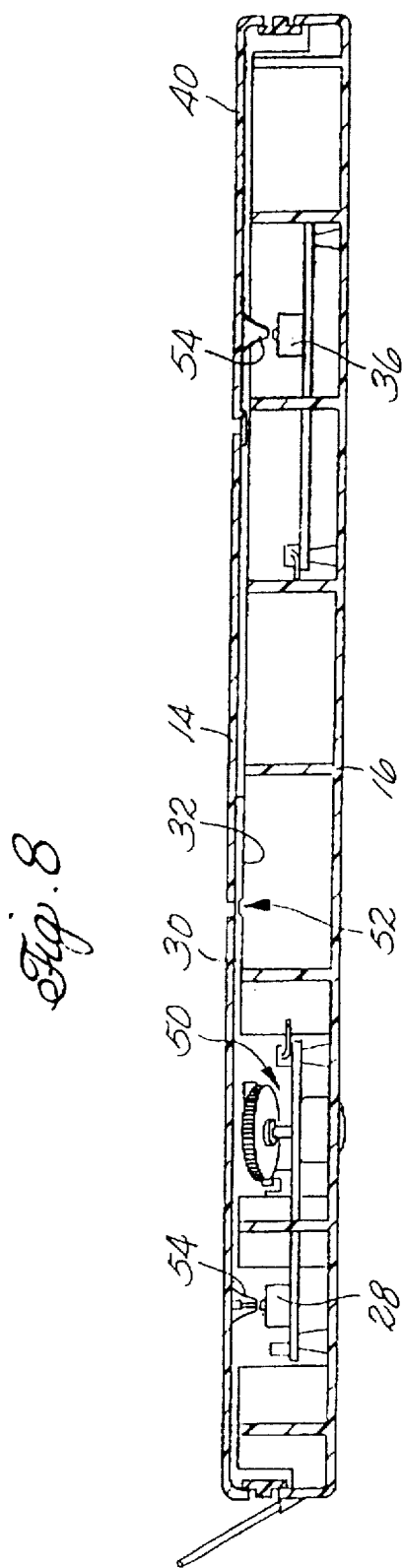

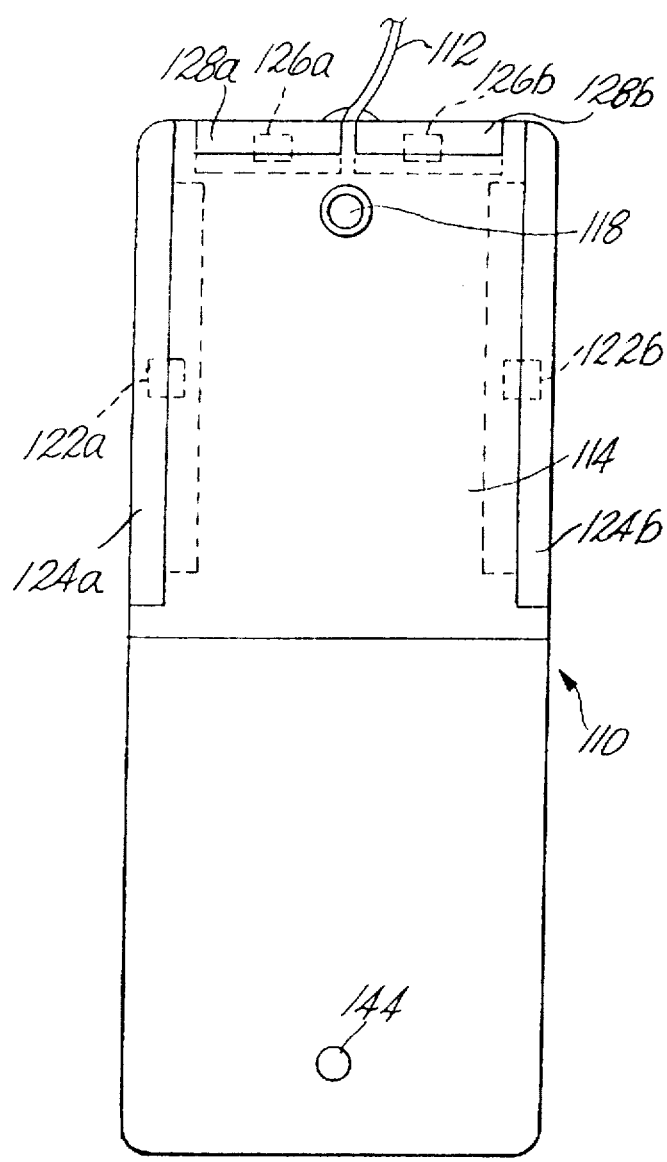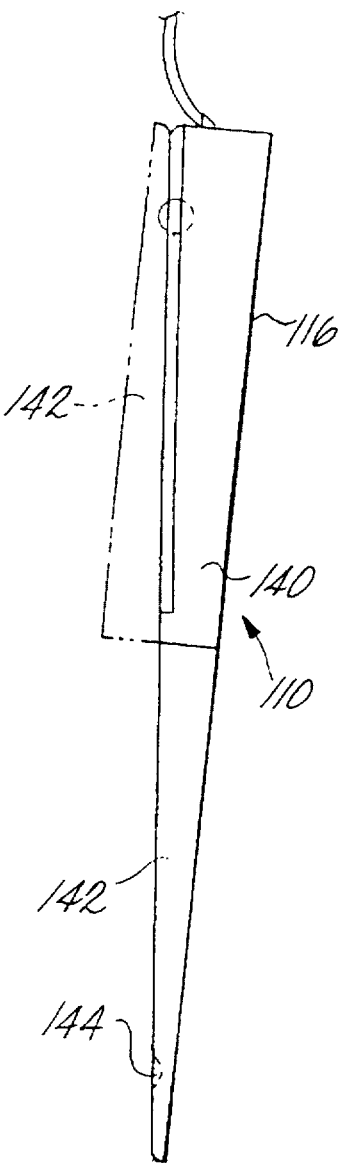

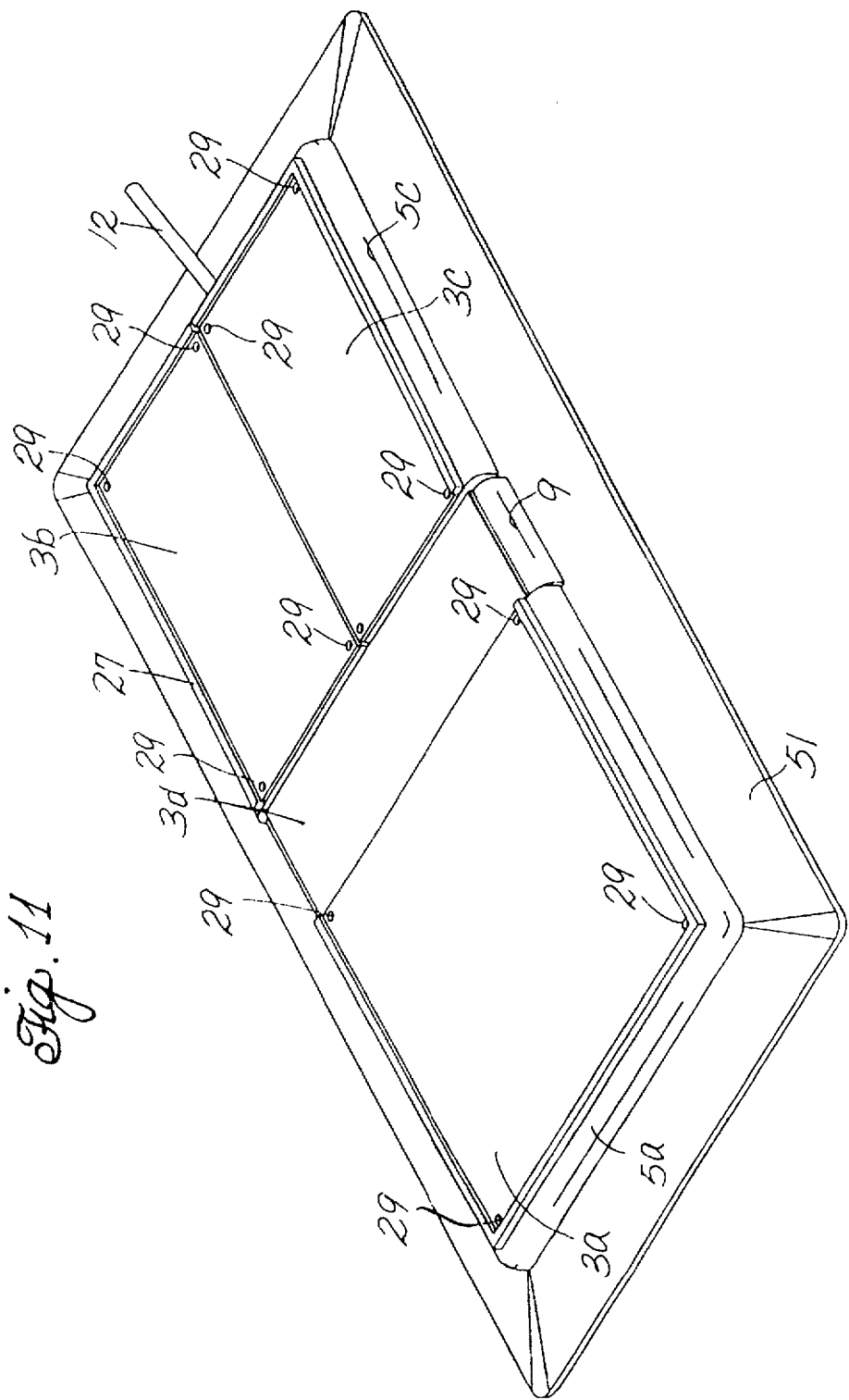

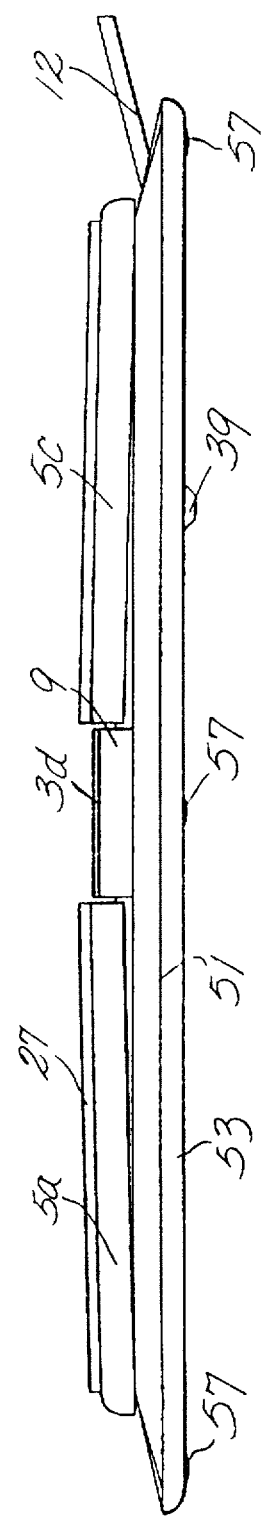

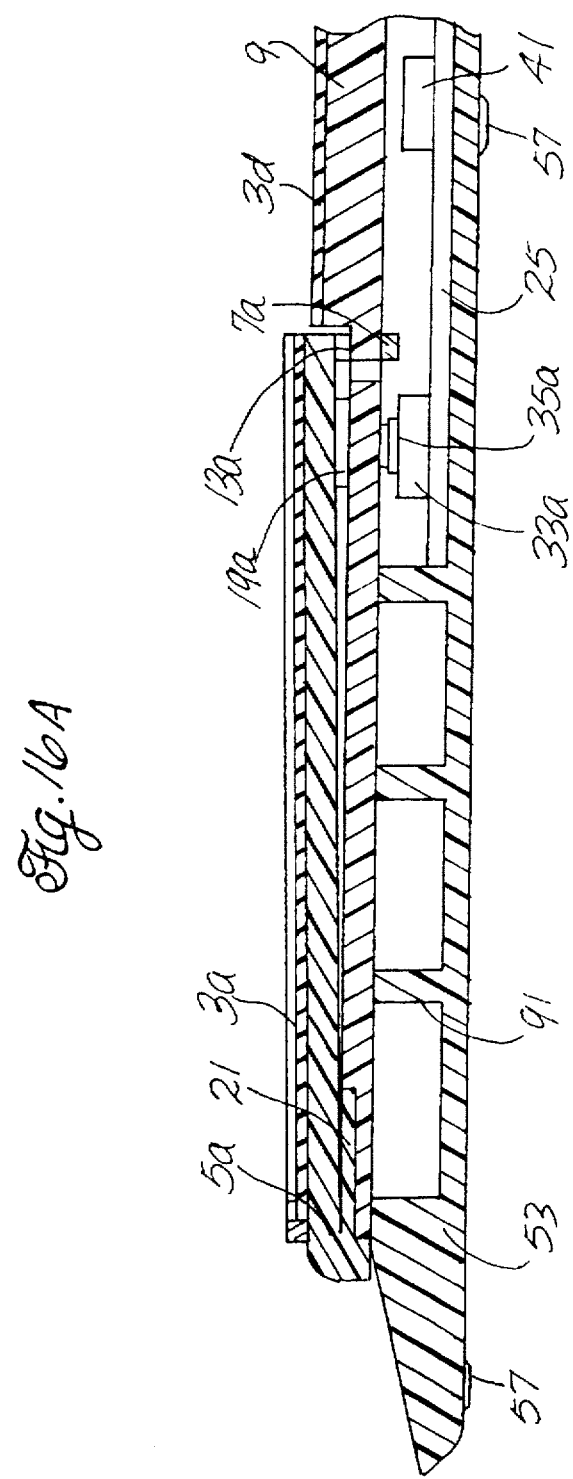

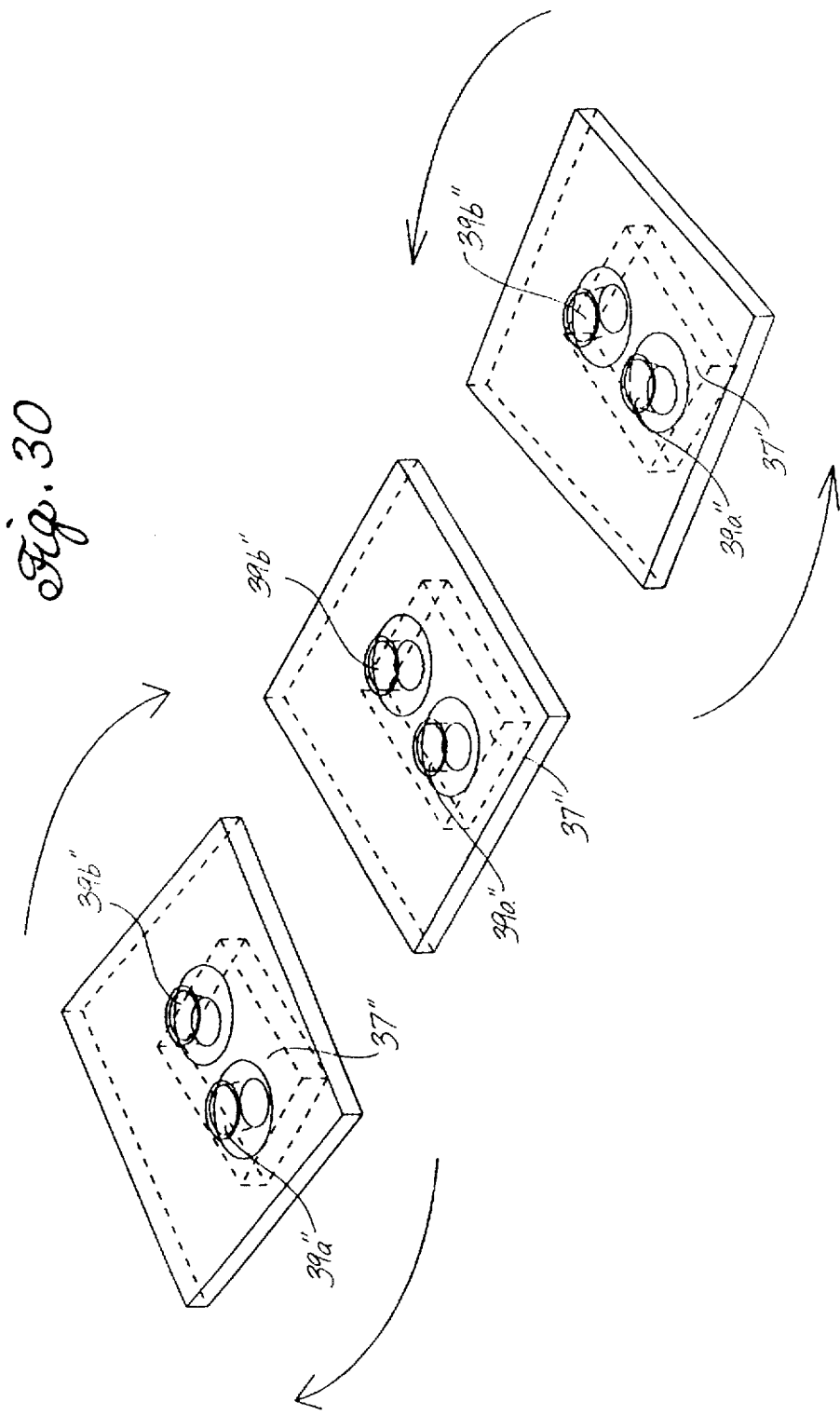

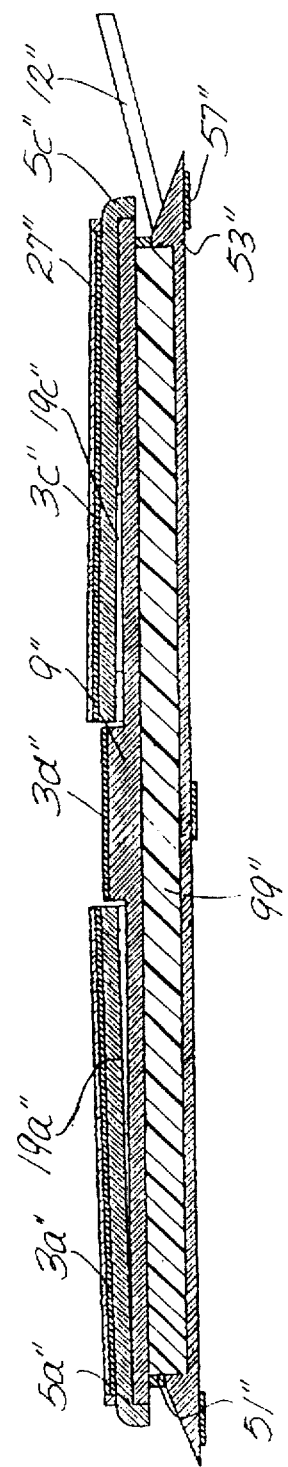

FOOT-OPERATED MULTI-DIRECTIONAL SENSING DEVICE

FIELD OF INVENTION

This invention relates to computer input devices. More particularly, it relates to foot-operated input devices such as mice, joysticks and track balls.

BACKGROUND OF INVENTION

A common feature of the most popular computer operating systems (OS) released since 1983 (e.g. those sold under the trademarks Apple OS, Windows OS, Windows NT, OS/2, Sun OS, NEXTSTEP OS, etc.) is the option or requirement that functions of the OS may be controlled by a mouse, a trackball or a joystick. This option has also been extended for use with video games such as those sold under the trademarks Sega Saturn, Panasonic 3D0, Nintendo Supernintendo, Sega Genesis, etc. The computer mouse, trackball or joystick is a hand-operated device to transmit information describing motion of a user to the computer. It additionally allows the user to transmit command information to the computer by hand activating one or more switches on the device. A typical mouse, for example, is hand moved over a planar surface such as a tabletop to provide two-dimensional control information to a computer responsive to movement of the mouse as disclosed in U.S. Pat. No. 3,541,541 by Douglas C. Engelbart. The most common type of mouse is the ball-type mouse. One such mouse is disclosed in U.S. Pat. No. 4,464,652 by William F. Lapson and William D. Atkinson, which is incorporated herein by reference. In such a mouse, a uniform spherical ball is held within the housing and is exposed at the base of the housing so as to contact any planar surface upon which the mouse is placed. As the user's hand grips the housing and moves the mouse over the surface, the ball rolls. As the ball rolls, its orientation relative to the housing changes. A pair of orthogonal encoders convert the rotational movement of the ball to electrical signals and thereby detect the change in relative orientation. The output signals of the encoders are provided by circuitry in the mouse which provides a corresponding input to the computer. Another type of mouse disclosed in U.S. Pat. No. 4,628,755 by Jack S. Hawley, also incorporated herein by reference, has, instead of a ball, a pair of axially-inclined X&Y transducers, each driven by a frustrum-shaped wheel.

The capabilities of the computer mouse have been exploited in modern graphical user interfaces (GUIs) on computer displays in several common modes of operation. Certain of these modes are designated "pointer moving", "single-clicking", "double-clicking", "triple-clicking", and "clicking and dragging".

The mode "pointer moving" takes motion information from the mouse and correspondingly repositions a marker on the display. The pointer may also be a cursor (indicating the location of an entry point for keyed text) or a tool (including a so-called paintbrush). The mode "clicking" takes switch state information from the mouse and changes the state of some on-display object, generally near the pointer. The term "clicking" is derived from the auditory and tactile properties of the types of spring return switches typically used with computer mice. The mode "clicking and dragging" combines the previous two modes to perform many different on-display roles, including the state change and subsequent on-display motion of an object. The "clicking" mode may be further specialized in most GUIs by establishing two or three "clicks" executed in a short specified time frame to indicate different operations than does a single "click." For example, a single-click may move a cursor to the location of the pointer, a double-click may change the state of the word under the cursor or pointer, and a triple-click may change the state of the entire text line under the cursor or pointer.

Further flexibility is provided by some mice that have two or three switches (buttons) instead of one and this flexibility is utilized by some of the aforementioned GUIs. The most common control functions, however, usually may be accomplished using only one mouse switch.

Another mouse mode allows a user to move an on-display pointer relatively farther on the display than the associated mouse movement over the mouse's working surface. For example, when the mouse has reached the end of a desk but the on-display pointer needs to be moved further in the same direction, the user must have a way to continue the pointer's motion. In this case, a user of a hand-held mouse picks up the mouse so its motion detecting system is disengaged, moves the mouse to a more favorable point on the working surface, and continues moving the mouse further in the original direction. This mode entails interruption of the delivery of motion information to the computer for the purpose of repositioning the mouse relative to the on-display cursor. This mode is hereinafter referred to as "mouse-pointer relative repositioning".

In a typical mouse, the switches and encoders or transducers provide raw signal information to circuitry within the mouse. The signals are processed and combined by circuitry in the mouse into a form suitable for communication as output signals from the mouse to the computer. Thereafter the signals are processed by software in the computer, typically designated as a mouse driver, and then used to provide input to another software program. Exemplary signal, hardware and software protocols are disclosed in THE WINN ROSCH HARDWARE BIBLE, Simon & Schuster, Inc. 1989, ISBN 0-13-160979-3 (See pp. 256–264); GUIDE TO THE MACINTOSH FAMILY HARDWARE, Addison-Wesley Publishing Company, Inc. 1990, ISBN 0-201-52405-8; and LOGITECH MOUSE USER'S MANUAL, Logitech, Inc. 1988, the disclosures of which are incorporated herein by reference. In a two-button protocol used by Microsoft Corporation and a three-button protocol used by MSC Technologies, Inc., information is communicated from the mouse to the computer in respective three and five-byte groups wherein, respectively, two and three bits of the first byte in the group correspond to the state of each button (more particularly to the state of the switch associated with each button).

In a typical computer application, such as word processing, there is a continual interchange of mouse and keyboard input. The user must continually switch his or her preferred hand from the computer keyboard to the mouse and back. In addition to the increased time required to accomplish the tasks, the possibility of error is increased in that the user's hand may not always return to the proper keyboard rest position. Also, such use of the hand may exacerbate repetitive strain injuries which have become common among computer operators.

This awkward and time consuming hand function could be eliminated if such devices could be operated using the foot rather than the hand. An article by New York Times entitles "New Mouse Resides on the Floor", 1985, discusses this solution by suggesting that a foot-operated input device be used to position the cursor on a display. U.S. Pat. No. 5,283,555 by Ward et al. discloses a horizontal top plate for receiving a foot is movably mounted above a stationary bottom for controlling a cursor on the display. However, Ward et al. comes up short in providing the capabilities of its hand-held counterpart in that it cannot be "clicked" to use pull-down menus. The inability to incorporate the "clicking" feature of the hand-held mouse into the foot-operated device is due to the lack of dexterity of the foot. The New York Times article expressly recognized this problem and suggested using a second foot-operated device to provide foot "clicking" capabilities.

U.S. Pat. No. 5,334,997 by Scallon attempts to resolve this problem by having the user place his or her foot into a container in which the bottom of the foot is used to control a track ball on the bottom surface of the container and the edges of the foot are used to activate switches mounted on the sidewalls of the container. However, the "clicking and dragging" modes implemented in most modern GUI's cannot be accomplished by Scallon.

This concept would have unlimited applications beyond those connected with typical modern GUI's for computer displays. For example, such a device would make an ideal control unit for video games and the like. In a typical application, a player may be disposed to move through a detailed landscape presented on the display by using a multi-directional control element such as a joystick device. Typically, a joystick device may be configured to provide forward motion, backward motion, rotate left or rotate right commands. Consequently, a player moving through the environment is forced to first turn left or right by placing the joystick control in corresponding position and then move forward in that direction by placing the joystick in the forward position. However, in many game applications it is desireable to have the player turn and move forward simultaneously. This is best illustrated in a situation where the user wishes to move in a circulatory path about an object while staying focused on the object. This requires that the user rotate in one direction while simultaneously strafing in the same direction.

Accordingly, there is an immediate need for a motion sensor having the switch functions typically associated with a joystick providing additional dimensions of motion. There is a further need to provide a motion sensor device typically associated with a mouse without requiring that the user disengage his or her hand(s) from the computer keyboard.

SUMMARY OF THE INVENTION

The present invention is directed to a foot-operated device that satisfies this need. There is accordingly provided in practice of preferred embodiments of the present invention a foot operated multi-directional sensing device for providing input information to a remote computer. The input information comprises motion input information which, for example, provides control for the position of a pointer on the display of the computer or alternatively moves a player in a video game through a landscaped environment. Additionally, the input information may comprise command input information which is associated with the state(s) of switch(es) on the device.

A housing is provided which comprises a base for resting on a surface supporting an elongated platform. Resilient biasing means is provided adjacent to the periphery of the platform for biasing and supporting the platform to a neutral position relative to said base.

BRIEF DESCRIPTION OF THE DRAWINGS

FIG. 1 is an isometric illustration of an embodiment of a foot-operated mouse-type computer input device according to principles of the present invention;

FIG. 2 is a top view of the device of FIG. 1;

FIG. 3 is a left side view of the device of FIG. 1;

FIG. 8 is a cutaway side view of a second embodiment of a mouse-type computer input device according to principles of the present invention;

FIG. 9 is a top view of a foldable foot-operated track ball-type computer input device according to principles of the present invention;

FIG. 10 is a side view of the device of FIG. 9 with a folded configuration shown in phantom;

FIG. 11 is an isometric illustration of a third embodiment of a foot-operated mouse-type computer input device having three switch buttons according to principles of the present invention;

FIG. 12 is a left side view of the device of FIG. 11;

FIG. 16A is an expanded view of the left side of the device of FIG. 16.

FIG. 30 is an isometric top view illustrating the relative motion of two motion sensors.

FIG. 31 is a cutaway side view of the devices of FIG. 21 having a resilient material disposed between the platform and the base.

DETAILED DESCRIPTION

Figure 4:
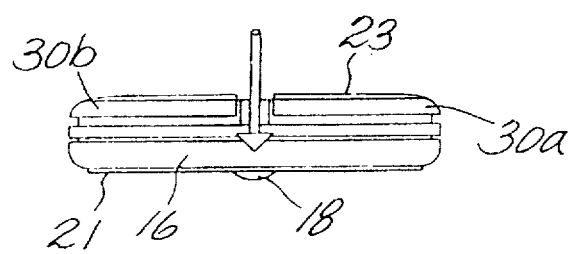
FIG. 4 is a front view of the device of FIG. 1.

A foot-operated mouse 10 embodiment of the invention is shown in FIG. 1. As is further shown in FIG. 7, the mouse 10 is adapted for use with a remote computer such as a conventional personal computer 200 to which the mouse 10 is connected via wiring 12.

The mouse has a housing which is formed of a suitably sturdy material such as acrylonitrile-butadiene-styrene (ABS) and includes an upward facing platform portion 14 which is of a size and shape for receiving and supporting a foot of a user (FIG. 2). The platform and housing are elongated between a fore or forward end 10a and an aft or rear end 10b so that the ball of the foot will rest at 10c and the heel of the foot at 10d on the platform. The housing additionally includes a downward facing base portion 16 which lies flat upon and engages a ground surface such as a hard or carpeted floor. Exemplary dimensions of the housing are 9.5 inches long (1) by 4 inches wide (w) and ¾ inch high (h).

Figure 14:
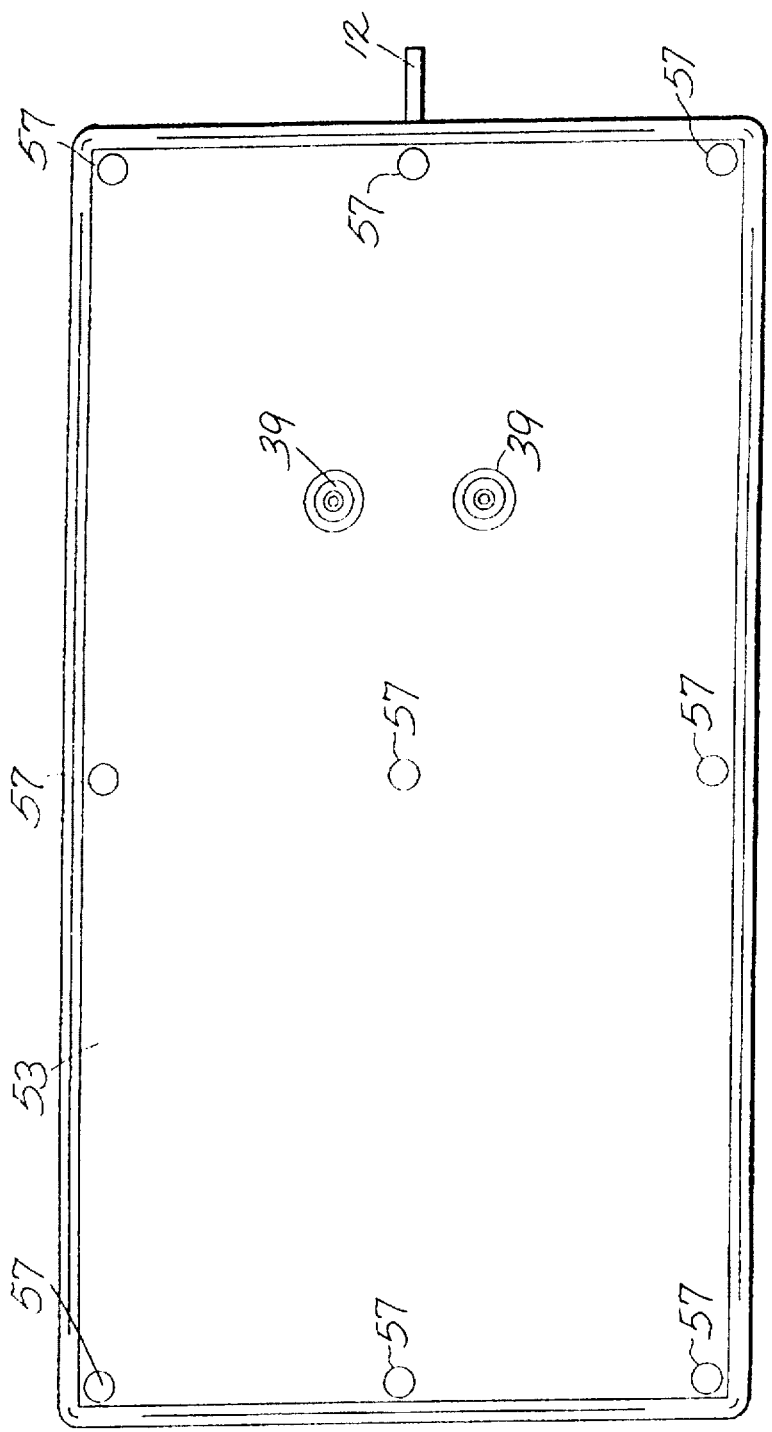
FIG. 14 is a bottom view of the device of FIG. 11.

The user's foot causes movement of the housing over the ground surface by applying force to the platform with the foot. For sensing such movement, the mouse comprises sensing means, one embodiment is of the type similar to that of a standard hand-operated mouse such as that disclosed in the aforementioned Lapson and Atkinson patent. As shown in FIGS. 3 and 5, this includes a spherical ball 18 rotatably held partially within the housing and extending through the base 16. As shown in FIG. 5, a removable retainer clip 20 is provided for retaining the ball within the housing and permitting its removal for cleaning, etc. Additionally, as an optional feature shown in FIG. 4, the mouse includes, by way of example, a strip 21 of low friction material attached along the length of the base 16 for providing a coupling means between the housing and the ground for reducing friction. A suitable material for the strip is ultra-high molecular weight (UHMW) polyethylene. The strip covers substantially the entire underside of the base, having a hole for the ball 18 and retainer clip 20. As an alternative to the strip 21, the friction reducing means may comprise a number of discrete pieces of friction reducing material. For example as shown in FIG. 14, one possible configuration involves a grid of nine round convex buttons 57 formed of high density nylon such as Delrin.

Figure 6:
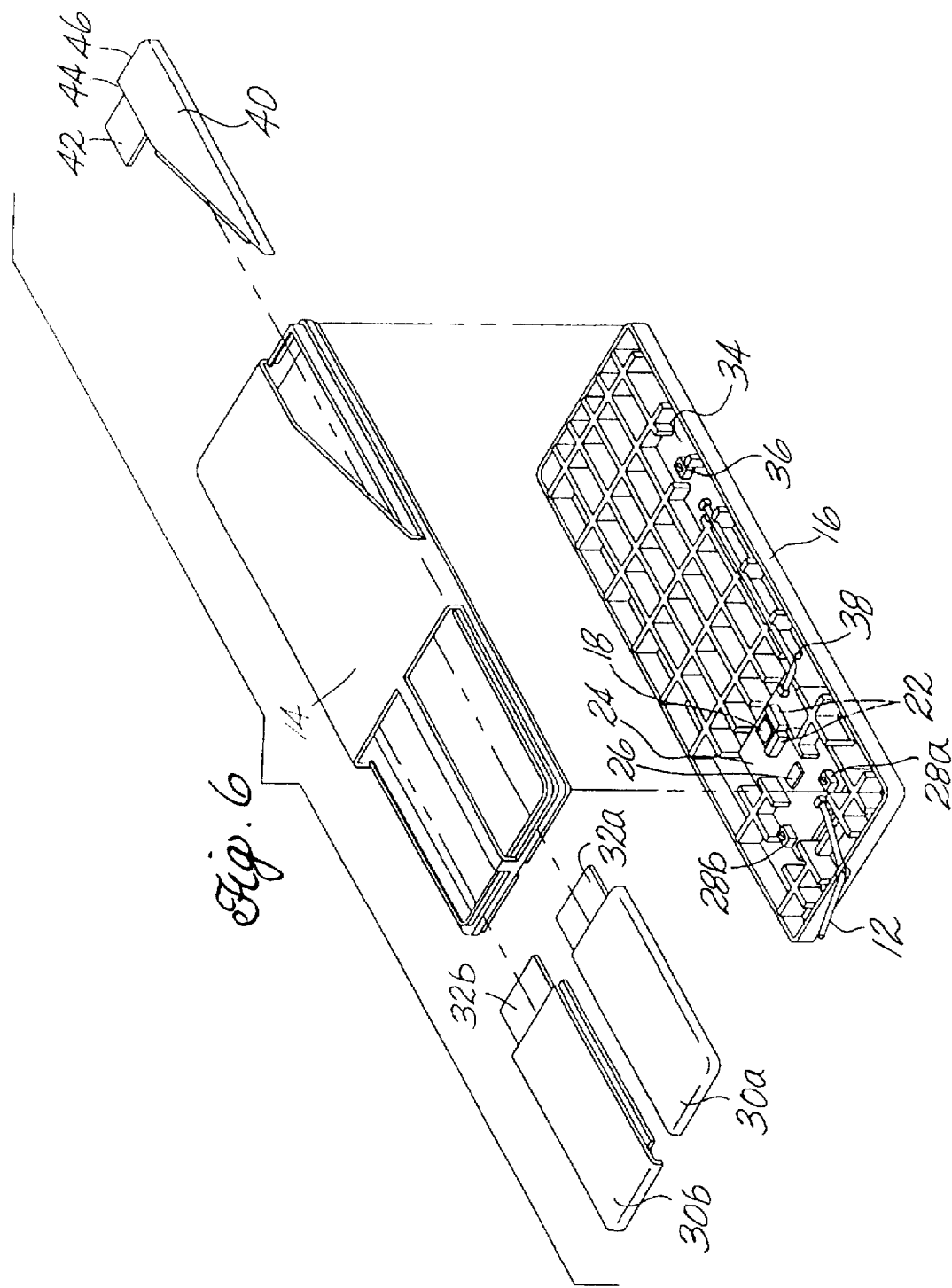
FIG. 6 is a partially exploded view of the device of FIG. 1.

As is shown schematically in the exploded view of the housing in FIG. 6, the sensing means includes the ball 18 and a pair of orthogonal sensors or encoders 22 mounted on a first circuit board 24 located within the forward area of the housing. The encoders, which may be of any known design, engage the ball to convert the ball's motion to corresponding electrical signals for producing information associated with rotation of the ball. The ball is supported against upward movement within the housing by a socket formed in the housing or by other means known in the field. As in the Lapson and Atkinson patent, the ball is laterally supported by the encoder shafts and a bearing (not shown). The wiring 12 extends from the first circuit board through the forward end of the housing for coupling the encoders to the computer for delivering the information associated with the rotation of the ball (thus indicative of the movement of the housing) as motion input information to the computer. Specifically, the encoders are connected by printed circuits or other conductive pathways (not shown) on the circuit board to circuitry 26 which is mounted on the circuit board. The circuitry includes one or more logic components, a microprocessor or other known means for translating the signals from the switches and encoders to representative signals for input to the computer. The circuitry 26, in turn is connected to the wiring 12 by additional printed circuits (not shown). To this end, the circuitry is similar to that used in any of the conventional mice referenced in the Background of the Invention.

A boss 25 (FIG. 3) extends from the forward end of the base 16 to guide the wiring 12 at an approximate 45° angle away from the ground surface on which the mouse is moved. This upward guidance of the wiring helps prevent the wiring from becoming trapped under the mouse.

Additionally, mounted on the first circuit board 24 are a pair of left and right pressure activated spring return switches 28a and 28b, respectively. Each switch has a moveable pressure member, cover piece, or button. In the assembled configuration shown in FIG. 1, the left and right buttons 30a & 30b, respectively, are located adjacent the platform portion 14 and encompass the left and right upper corner portions, respectively, at the front of the mouse. As is shown in FIG. 2, when the user places his or her foot 300 atop the mouse, the foreportion 302 of the foot at least partially covers the buttons 30a and 30b.

Figure 5:
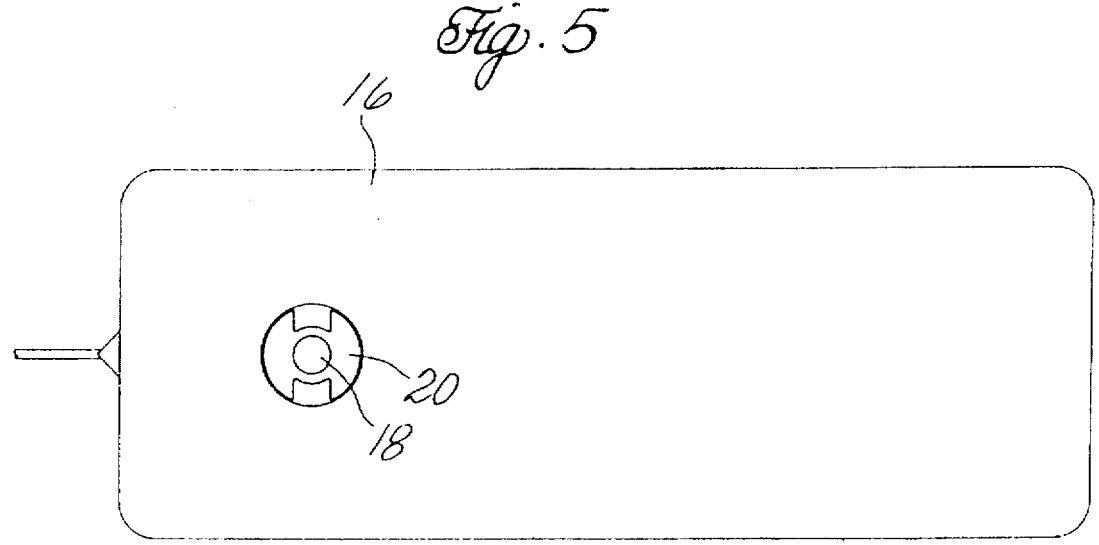
FIG. 5 is a bottom view of the device of FIG. 1.

As is shown in FIG. 4, the buttons 30a and 30b may have an elastomeric coating 23 to assist in the engagement both in terms of raising the level of the buttons above the platform portion and establishing friction between the buttons and the foot so that the foot does not slip off the device. A suitable coating is a closed cell neoprene. In their relaxed position the buttons 30a and 30b are approximately flush at the level of the platform portion 14 of the housing. When the user places his or her foot atop the mouse so that the foot is supported by the platform portion, the foreportion of the foot engages (depresses) either or both the buttons 30a and 30b (and thus either or both the switches 28a and 28b).

As is shown in the exploded view of FIG. 6, extending aft from the main body of each button 30 is a flexible tab 32. When assembled, the flexible tabs 32 are held beneath the platform portion 14 and secured against the structure of the base portion 16. When the buttons are depressed to change the switch state, the tabs flex under the pressure applied by the foot. When the pressure is released, they unflex to raise the button, allowing the switches to return to their original state.

As is further shown in FIG. 6, a second circuit board 34 is located within a rear area of the housing adjacent its left side. A pressure actuated switch 36 is mounted on the second circuit board. A wire jumper 38 connects the printed circuits (not shown) on the second circuit board 34 to those on the first circuit board 24 for coupling the switch 36 to the circuitry 26 and then to the computer via wiring 12.

As with the switches 28͏ 28b, there is a cover piece or button 40 which, in the ͏ ͏d configuration shown in FIG. 1, encompasses th͏ ͏ur corner portion of the mouse. As is shown in Fl͏ ͏ ͏n distinction to the buttons 30a and 30b, the button 40 (and thus the switch 36) is engaged and actuated by the heel 304 of the foot or, more particularly the left portion of the heel.

Additionally, whereas the buttons 30a and 30b are of substantially rectangular shape and have tabs 32 extending aft, the button 40 is of somewhat trapezoidal shape and has a tab 42 extending laterally inward from its inboard edge 44 adjacent its rear end 46. Thus, whereas the buttons 30a and 30b flex forward and downward, the button 40 flexes downward and to the left. Additionally, the trapezoidal shape allows the user to disengage the rear button by fully lifting his or her heel, shifting the heel slightly to the side and placing it back down on the platform portion 14 aside the button. This facilitates execution of the mode "clicking and dragging" with the foot fully down.

To facilitate economy in manufacture, the first and second circuit boards 24 and 34, respectively, may be fabricated initially as a preformed unitary piece from which the first and second circuit boards are separated as first and second pieces. For example, in the arrangement shown in FIG. 6, a side edge of the second piece or board 34 may be broken from the front or rear edge of the first piece 24.

Turning to FIG. 8 a side section of an alternate embodiment of a mouse device is shown. The embodiment of FIG. 8 is essentially the same as that of FIG. 1 except that it features a pair of inclined axis transducers 50 (as disclosed in the aforementioned Hawley patent) in place of the ball-type sensing means. Each of the buttons 30a and 30b, which are the same as those of FIG. 1, have a flexible tab 32 held beneath the platform portion 14. A recess 52 formed in the underside of the tab 32 increases flexibility for downward movement of the button. Fingers 54 depend from the undersides of the buttons 30a and 30b and 40 for engaging the switches 28a and 28b and 36, respectively.

Turning to FIGS. 11–18, structural enhancements may be implemented to provide increased stability and facilitate ease of operation. Referring to FIG. 11, a foot-operated mouse is shown having heel switch actuation surface 5a located at the rear of the mouse and two front switch actuation surfaces 5b and 5c located at the front end of the mouse. A high friction material 3a, 3b, and 3c may be attached to each actuation surface to grip the foot. Each actuation surface may further be provided with ridges disposed about the periphery to assist the user in adjusting his or her foot orientation on the device and to enhance the user's sense of contact and control the device.

Figure 13:
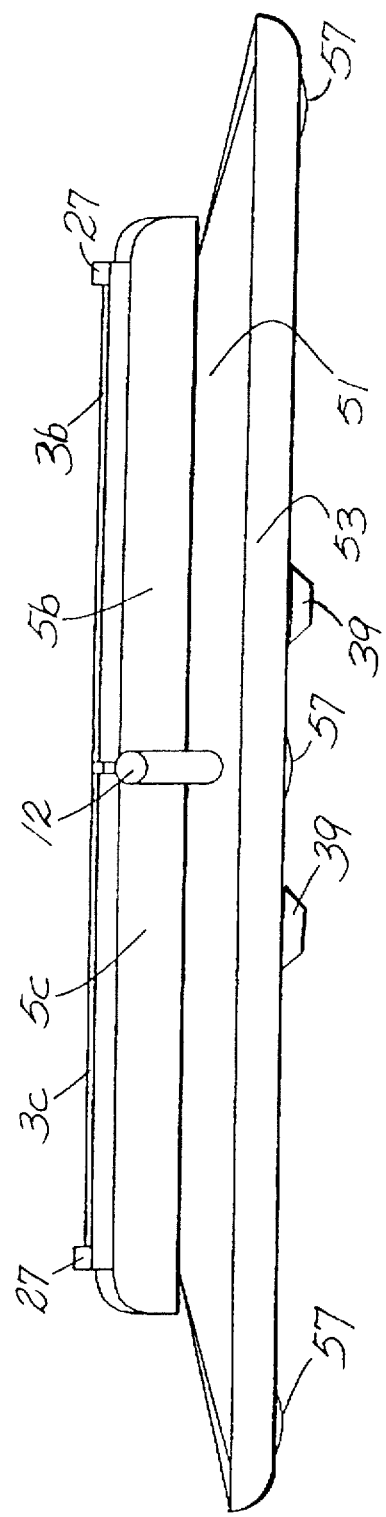
FIG. 13 is a front view of the device of FIG. 11.

Referring to FIG. 12 and FIG. 13 the switch actuation surfaces are supported by a housing comprising an upper base 51 and a lower base 53. The upper base is flared out to provide increased stability of the mouse device. This configuration reduces the tendency of the device to tilt when the weight distribution across the switch actuation surfaces is shifted as a result of clicking the device. Further mobility may be achieved by forming the lower base 53 with an upwardly curved lip around its perimeter. This configuration results in a mouse device suitable for use along uneven surfaces such as tightly woven carpet.

Figure 15:
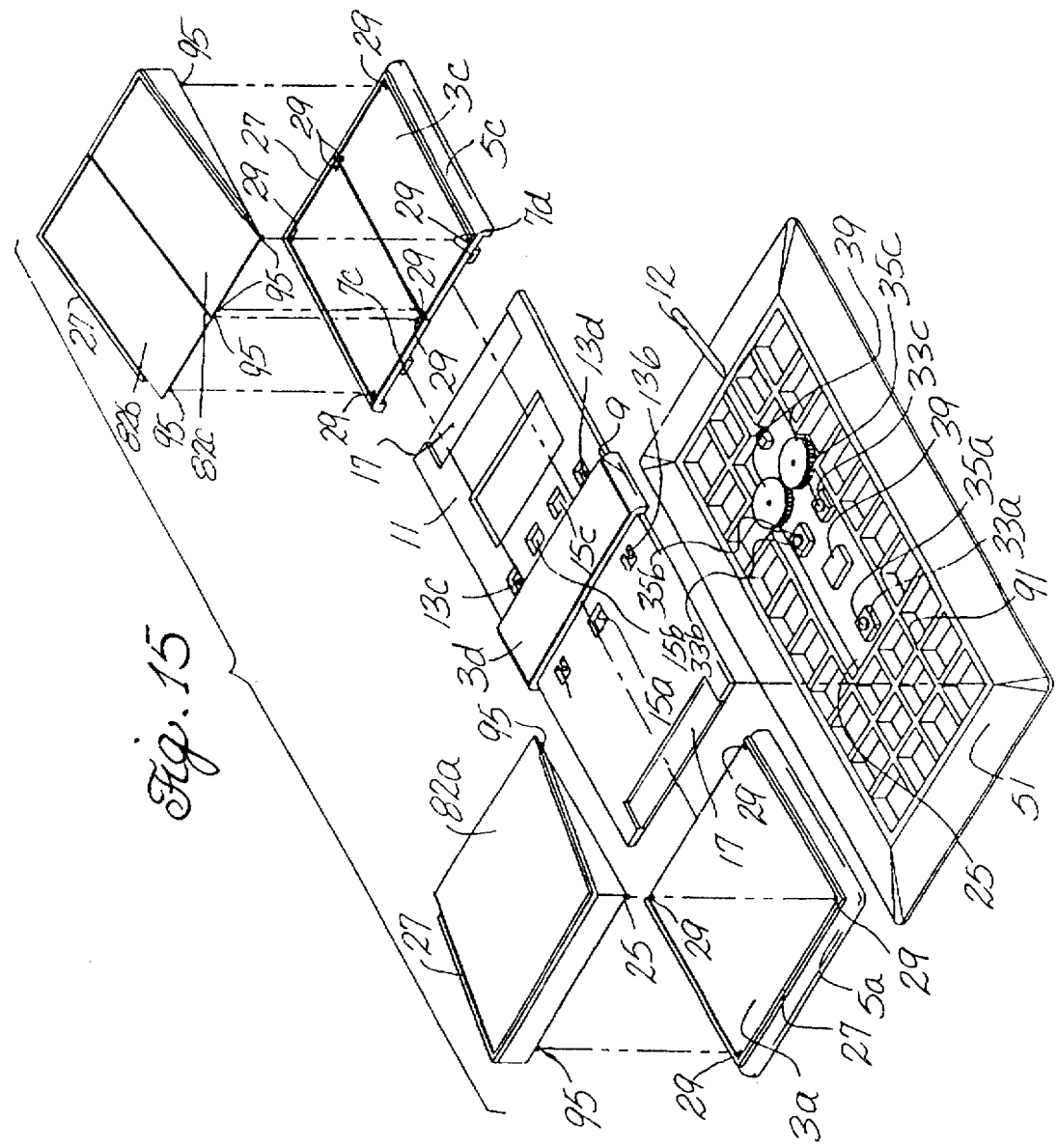
FIG. 15 is a partially exploded view of the device of FIG. 11 fitted with switch button wedges to accommodate the contour of a shoe.
Figure 16:
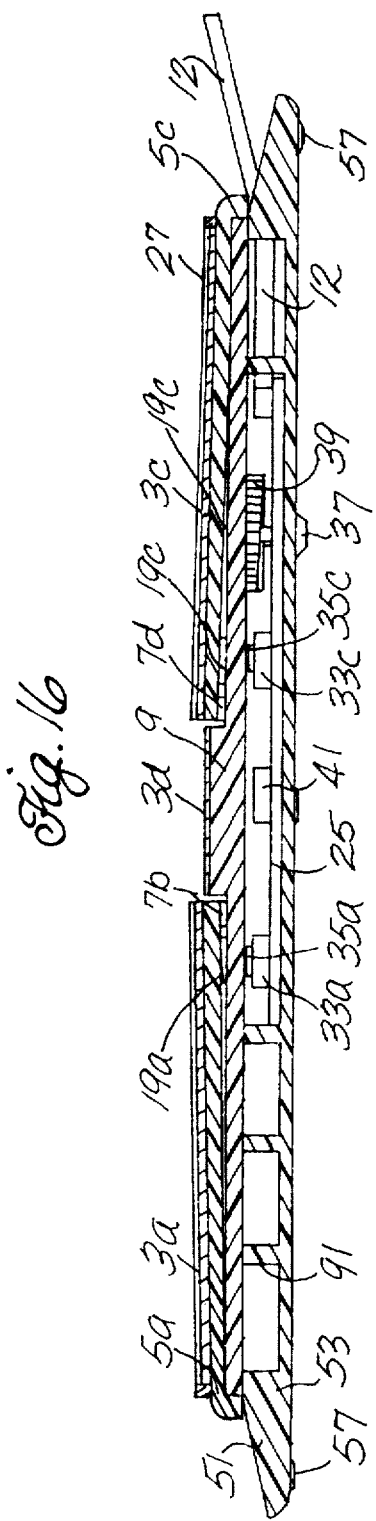
FIG. 16 is a cutaway side view of the device of FIG. 11.

Referring to the exploded view of the foot-operated mouse in FIG. 15, the switch actuation surfaces 5a, 5b, and 5c are mounted onto an upper plate 11 which is supported by the upper base 51. Improved structural integrity is achieved by forming the upper base with an internal supporting structure 91. This configuration distributes the loading of the foot across the support members. Three pressure activated spring loaded switches 35a, 35b, and 35c installed in switch housings 33a, 33b, and 33c respectively are mounted onto a printed circuit board 25 located centrally in the lower base 51 and extends upwardly towards a respective opening 15a, 15b, and 15c in the upper plate 11. Referring to FIG. 16 switch actuation surfaces 5a, 5b (not shown), and 5c are hinged to the upper plate 11 by hinges 21a, 21b (not shown), and 21c respectively. Each hinge 21 is formed with its respective switch actuation surface and molded at an angle thereto so that when the hinges are bonded to the upper plate 11 there is a constant pressure applied to the respective switch actuation surface forcing said surface to form an acute angle with respect to the upper plate 11 unless an external force is applied thereon. The precise angle at which the switch actuation surfaces are maintained is determined by a tab and slot arrangement. This is best illustrated in FIG. 16A wherein each switch actuation surface is provided with a slot 7 mounted on the underside and positioned to accept a mating tab 13 formed with the upper plate. When an upward force is exerted on the switch actuation surfaces by its respective hinge, the tab engages the bottom surface of the slot and prevents further upward movement of the switch actuation surface. The acute angle of the switch actuation surfaces result in protrusions 19a, 19b, and 19c mounted on the underside of said surfaces to be disengaged from pressure activated spring loaded switches. When a user applies an external force to the switch actuation surface, the protrusion 19a, 19b, and 19c engage switches 34a, 34b, and 34c respectively through the openings 15a, 15b, and 15c in the upper plate 11. As shown in the assembled configuration of FIG. 11, the left and right actuation surfaces cover laterally and from front to back substantially the entire front portion of the upper plate 11 and are positioned adjacent to a middle support bracket 9. The heel button covers laterally and from front to back substantially the entire rear portion of the upper plate 11 and abuts against the opposite side of the middle support bracket 9. Accordingly, by utilizing switch actuation surfaces that cover substantially the entire surface of the upper plate in conjunction with hinging said surfaces at the end of the mouse, increase adaptability to different foot sizes achieved, and the impact of the foot position on the device is minimized.

As shown in FIG. 15, button wedges 82 may be utilized to maintain optimal angle of the ankle regardless of shoe type for the purpose of enhancing ergonomics. The wedges 81 can be snapped onto the top of the switch actuation surfaces, for example, to compensate for the heel size or the sitting position of the user. Wedge pegs 95 are inserted into mating receptacles 29 where the wedges are held in place by the insertion force of said connection. It should be noted that the wedges are depicted on the front portion and the rear portion of the device for illustrative purposes only and would not both be used at the same time during operation. Accordingly, a front wedge will be used to compensate for a high heel of the user and a rear wedge will be used to compensate for a low or no heel. Similarly, to the switch actuation surfaces described above, ridges 27 may be provided around the periphery of the wedges to assist the user in adjusting his or her foot orientation on the device and to enhance the user's sense of contact and control of the device.

Figure 18:
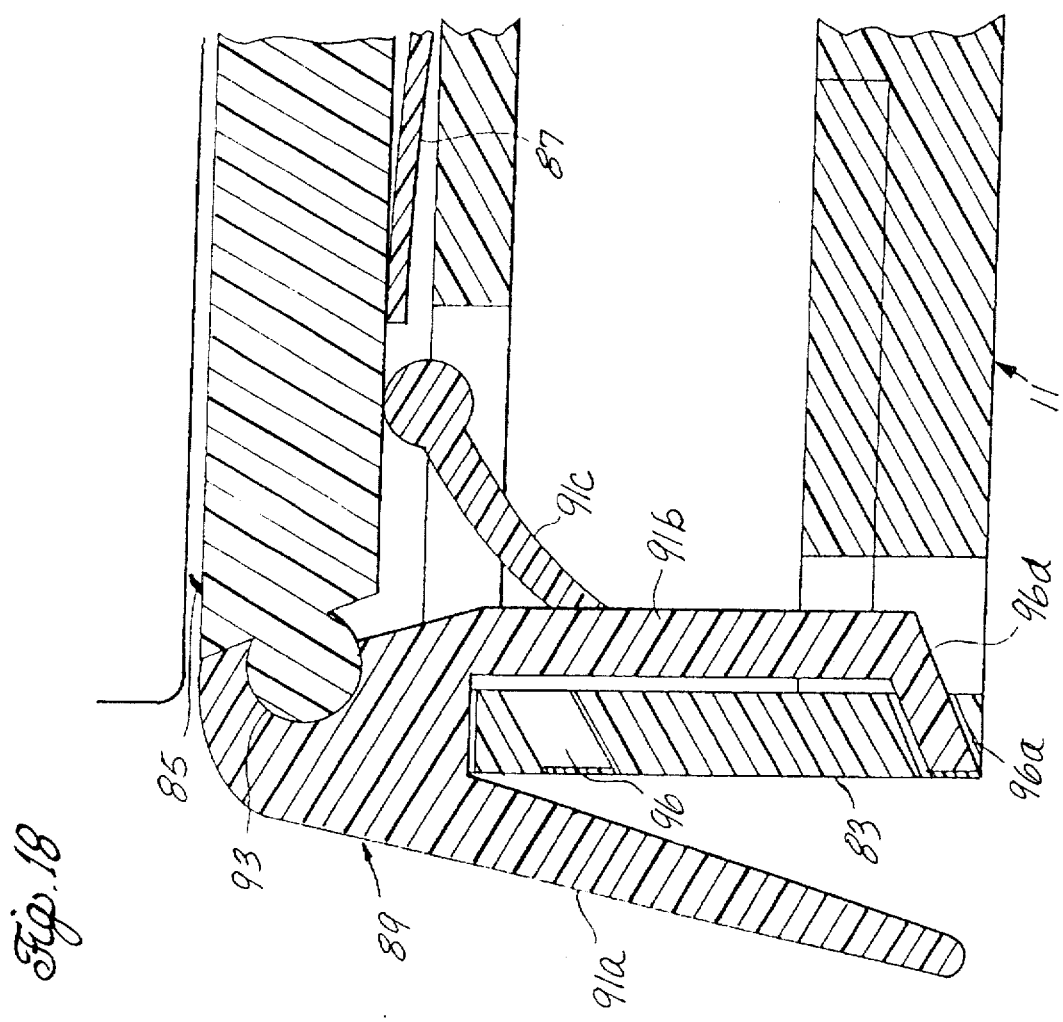
FIG. 18 is an illustration of a pop up wedge embodiment according to the principles of the present invention.

Optionally, the wedges can be pivoted and spring loaded into the mouse and released by actuating a mechanical switch positioned thereon. FIG. 18 depicts an exemplary embodiment of this concept. A switch actuator 89 is formed with a switch actuation surface 91a, a latch 91b, a spring 91c, and a locking shoulder 91d mounted on the upper plate 11. Switch actuation surface 91a and latch 91b straddle a latch engaging post 83. A wedge top 85 is connected to switch actuator 89 through a pivotal ball joint 93. As a result, switch actuator 89 can be rotated relative to wedge top 85. A flat metal spring 87 biases latch 91b and switch actuation surface 91a in a counterclockwise direction as viewed in FIG. 18. Locking shoulder 91d is formed on the end of latch 91b. A recess 96a formed near the bottom of post 83 engages locking shoulder 91d when the wedge top 85 is positioned substantially parallel to the upper plate 11. Recess 96b formed near the top of post 83 engages locking shoulder 91d when the wedge top 85 is released to provide a sloping surface in which to rest the user's foot.

To release the wedge top 85, the user pushes on the switch actuation surface 91a in a direction opposing the biasing force of spring 91c causing switch actuator 89 to pivot about ball joint 93 until locking shoulder 91d disengages from recess 96a and moves upwardly along the vertical surface of post 83 under the force of spring 87 until the locking shoulder 91d is aligned with recess 96b where it is engaged thereby by spring 91c for locking the wedge top 85 in place.

Conversely, to lock the wedge top 85 down, an opposing force to the spring 91 bias is applied to the switch actuation surface 91a causing switch actuator 89 to pivot about ball joint 93 until locking shoulder 91d disengages from recess 96b. Once disengaged, a downward force exerted on wedge top 85 overcomes the force of spring 87 and thus moves the wedge top 85 in a downward direction until the locking shoulder 91d is aligned with recess 96a where it is engaged thereby by spring 91c for locking the wedge top 85 in place.

Figure 17:
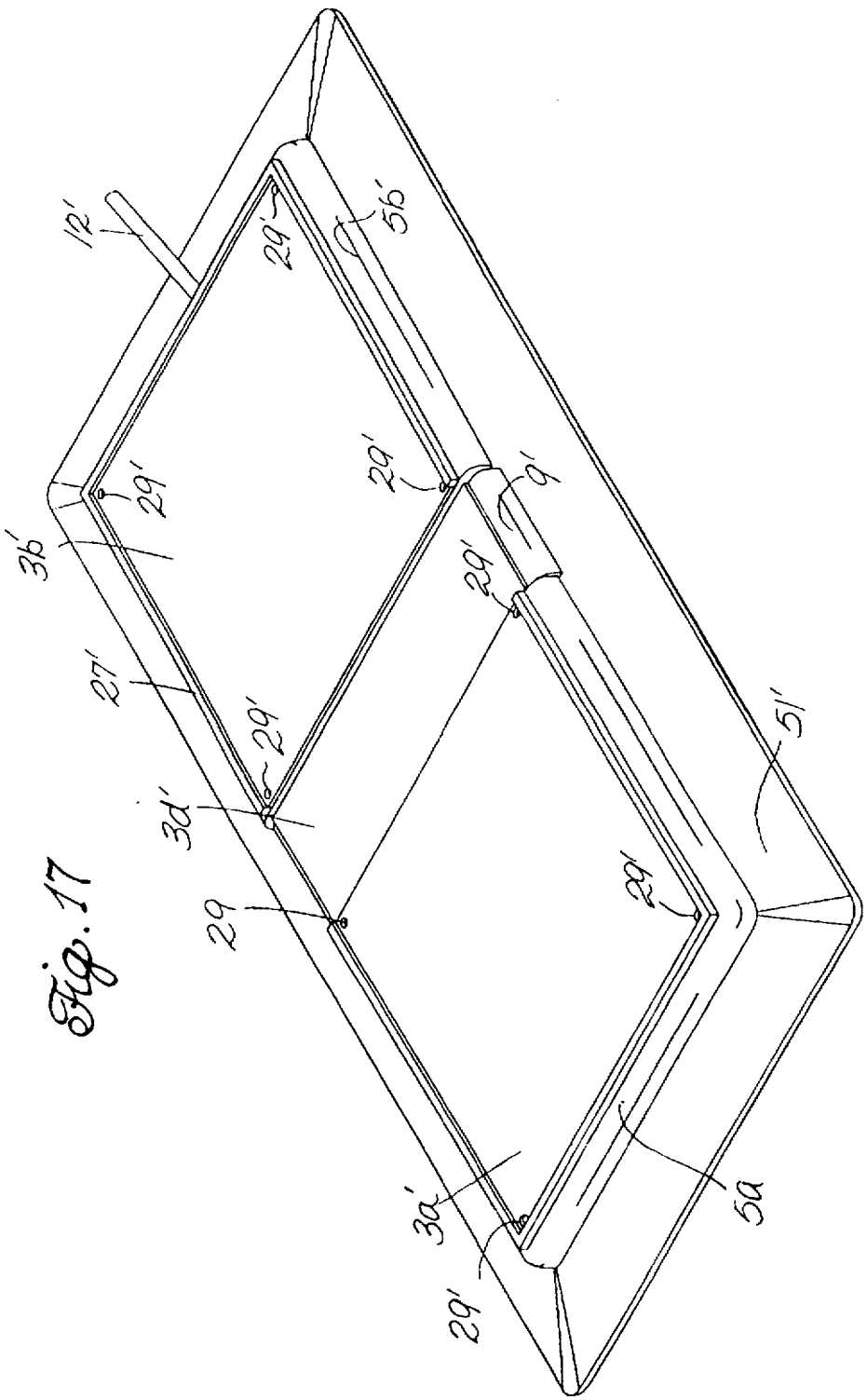
FIG. 17 is an isometric illustration of a fourth embodiment of a foot-operated mouse-type computer input device having two switch buttons according to principles of the present invention.

It will be understood by one having ordinary skill in the art that the structural enhancements disclosed above can be embodied in a foot operating input device having a heel switch and a front switch as depicted in FIG. 17. In this configuration, actuation surfaces 5a and 5b are provided for generating command input to the computer. The upper base 51 may be similarly flared out to provide increased stability. An upper plate (not shown) supports the switch actuation surfaces which are mounted adjacent to a support bracket 9. A high friction surface 3a and 3b may be placed on the switch actuation surfaces for gripping the foot. Receptacles 29 for wedge pegs are also provided.

Figure 7:
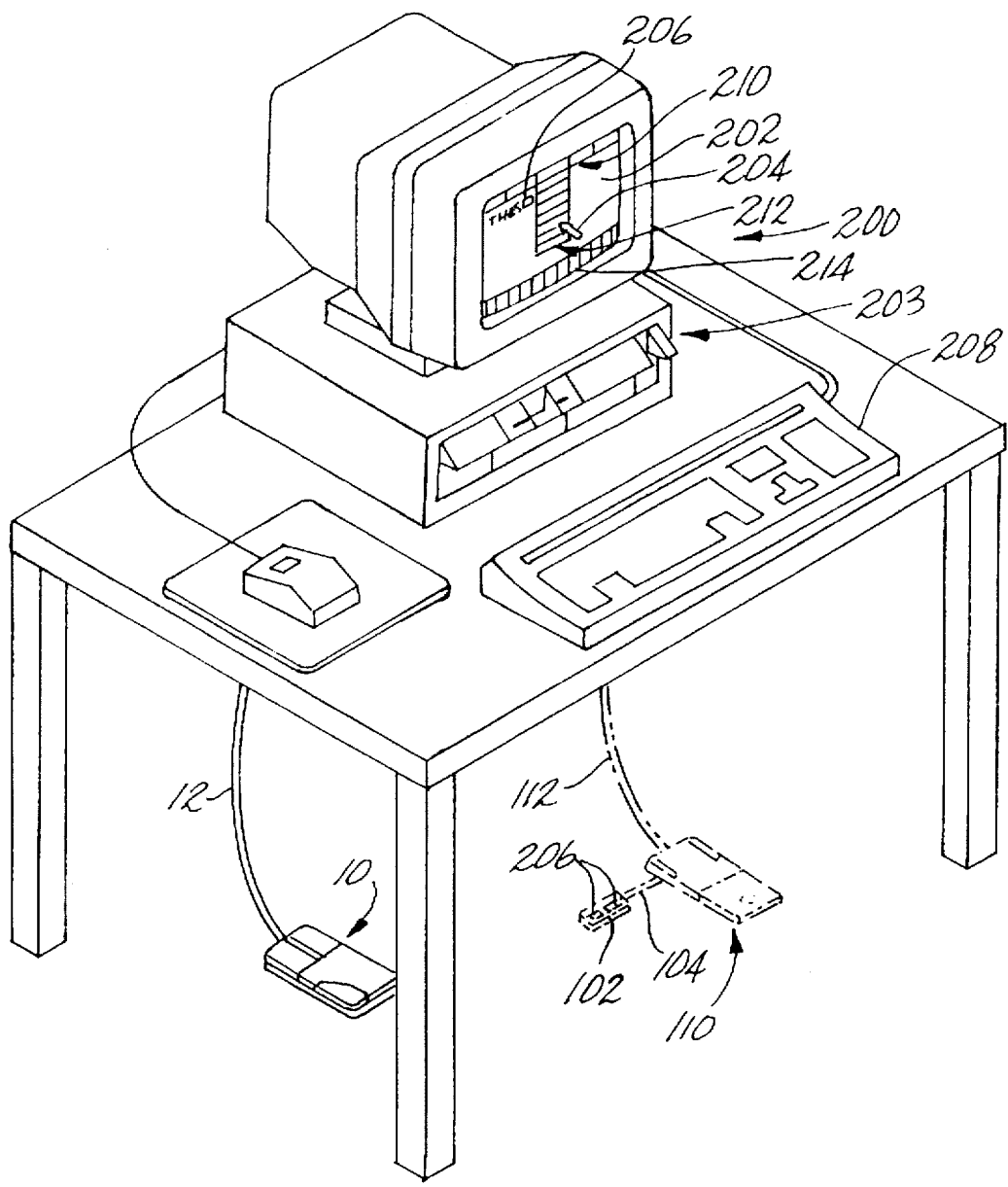
FIG. 7 is a semi-schematic view of a computer with an input devices according to principles of the present invention.

To illustrate a typical application, the foot-operated input device of the present invention will be described below in conjunction with a computer 200 having a display 202 and a processing unit 203 as shown in FIG. 7. It will be understood by one skilled in the art that many other applications are possible using the foot-operated input device of the present invention such as for video games and the like. In this example, a number of items are shown on-screen on the computer display. These include a pointer 204, a cursor 206 which indicates the entry location for data from the keyboard 208, a menu bar 210 having pull-down menus 212, and a tool bar 214 all conventional in mouse operated computer systems.

In this embodiment, the mouse 10 is used to provide input information signals to the computer which comprise both position control and command information. The position control information causes a single on-screen item to be moved within a static screen or alternatively moves the entire screen or image on the screen (such as changing the view-point from which a scene is viewed, etc.). The command information may cause selection of an on-screen item such as an object (e.g. a file, a word, a character . . . ) or a command, tool, process or function (print, spell check, quit etc.).

In this embodiment to move an on-screen pointer, the user first places his or her foot atop the foot-operated mouse so that the front of the foot engages the forward buttons and the heel engages the rear button as has been previously described. When the user moves the mouse over the ground surface under control of the user's foot, output signals from the mouse caused by rotation of the ball cause the pointer position to be moved with the mouse. In this embodiment movement of the foot and mouse along the ground surface left, right, forward and backward produces a corresponding movement of the pointer left, right, up and down, respectively, on the display. When the user reaches the end of the range of motion of the mouse, but still needs to move the pointer further, mouse-pointer relative repositioning is achieved by decoupling the position of the pointer from the movement of the mouse by raising the foreportion of the user's foot to disengage the forward buttons and thus alter the state of the forward switches which in turn interrupts the motion signals sent to the computer. With the foreportion of the foot disengaged from the forward switches, the mouse is moved (with the mid and rear portions of the foot) while the computer maintains the position of the pointer constant, decoupled from the movement of the mouse. To recouple the movement of the pointer to the movement of the mouse, the user lowers the foreportion of his or her foot to re-engage and activate the forward buttons and alter the state of the forward switches.

Figure 19:
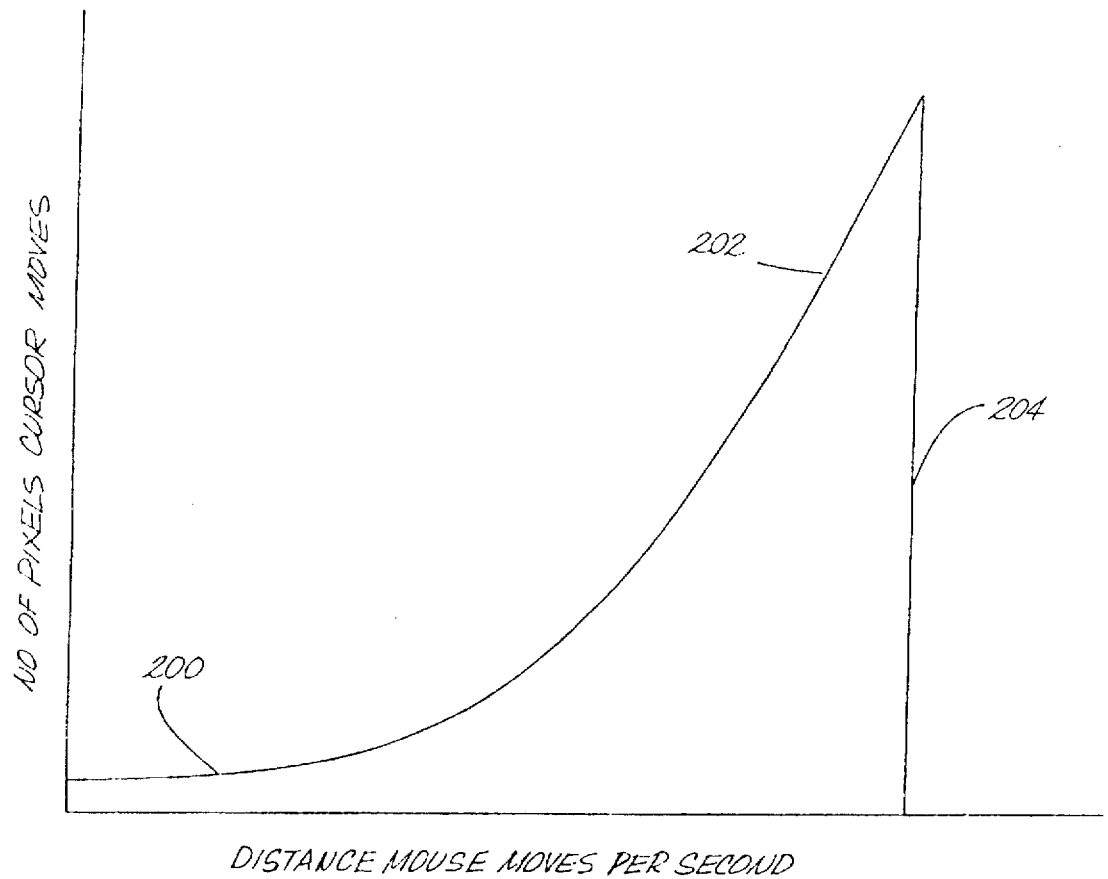
FIG. 19 is a graphical representation of an acceleration profile of the cursor relative to the movement of the foot-operated input device.

Optionally, the decoupling of the position of the pointer from the movement of the mouse may be performed by programming an acceleration profile into the mouse driver of the computer. This would free up the forward switch for performing command input functions typical of a secondary hand-held mouse button. Exemplary of such mouse driver capable of accepting such a program includes the Microsoft Mouse Driver version 9.0. FIG. 19 is a graphic representation of a typical acceleration profile showing the speed of the cursor on the display with respect to the speed of the mouse. As illustrated from the exemplary acceleration profile, the speed of the cursor increases exponentially as the speed of the mouse is increased until the mouse reaches a threshold speed where the cursor becomes unresponsive to further movement of the mouse. Alternatively, the mouse driver can be programmed to decouple the movement of the mouse from cursor when a key is depressed on a keyboard and recoupled in a similar manner.

Figure 20:
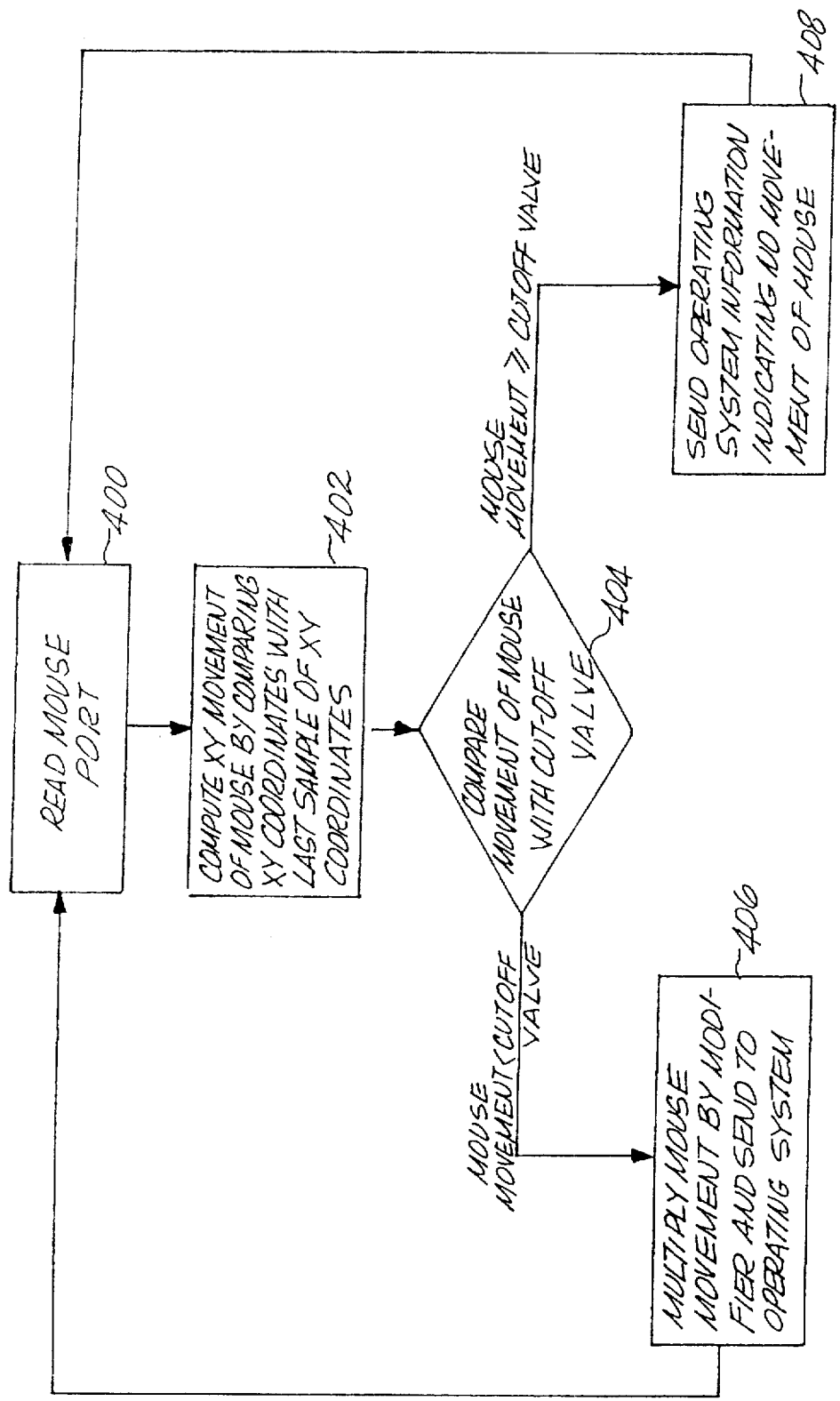
FIG. 20 is a flow diagram illustrating the operation of the mouse driver implementing the acceleration profile of FIG. 19.

One implementation of this function entails storing a plurality of look-up tables in the mouse driver, with each look-up table constituting a separate acceleration profile, any one of which may be selected by the user. The acceleration profiles provide a modifier to convert the distance moved by the mouse during a fixed interval into a command to the computer for moving a cursor on a display a prescribed distance. An exemplary acceleration profile flow chart that may be programmed in the mouse driver is shown in FIG. 20. Under this program, the position data outputted from the foot-operated input device is coupled to the mouse driver where it is sampled and read at periodic intervals 400. The change in position of the input device is computed by comparing the current position data with the previous sample of position data 402. The computed result is compared to a cut-off value stored in the mouse driver 404. When the change in position of the mouse exceeds or equals the cut-off value, the mouse driver sends the operating system a signal indicating that the mouse has not moved 408. Alternatively, when the change in position of the mouse is less than the cut-off value, the change in position is multiplied by a modifier stored in the selected look-up table 406. The modified signal is sent to the operating system causing the cursor to be moved on the display by the modified value. Accordingly, by programming a cut-off value in the acceleration profile, the user may reposition the mouse relative to the cursor on the display without disengaging the rear or front switch actuation surfaces by quickly jerking the mouse in the desired direction. It will be understood by one skilled in the art that the programming of the acceleration profile in the mouse driver is for illustrative purposes only, and may be performed elsewhere in the computer system with either a software or hardware implementation.

The "clicking" functions of providing command input to the computer are accomplished largely with the heel. The so called "single-clicking" function is achieved by raising and then lowering the heel, with the associated changes in switch state as noted above. This is in distinction to the clicking function on a conventional hand-held mouse in which single-clicking is achieved by first lowering a finger to engage the switch and then raising the finger to disengage the switch. Similarly, the double-clicking and triple-clicking functions are accomplished by repeating this process two or three times, respectively. Except as is described below, this all is accomplished without moving the foreportion of the foot and altering the state of the forward switches.

The clicking and dragging function is achieved by first selecting (causing the computer to select) an on-screen item by moving the pointer to said item and coupling the position of the item to movement of the mouse by raising the heel so as to alter the state of the rear switch. The item may then be moved by moving the mouse. Finally, the position of the item is decoupled from movement of the mouse by lowering the heel to re-engage the heel button and alter the state of the second switch.

The presence of two forward buttons allows for providing alternate command input in addition to the alternatives offered by the three modes single-clicking, double-clicking and triple-clicking. For example, within the process of single-clicking described above, any of a first, second or third command input may be provided by, respectively, doing one of the following:

i) raising the left side of the foreportion of the user's foot to disengage the left forward button without disengaging the right forward button;
ii) raising the right side of the foreportion of a user's foot to disengage the right forward button without disengaging the left forward button; or
iii) maintaining the engagement of the foot with the both forward buttons.

Accordingly, such a mouse may be used in place of a conventional three-button hand-operated mouse. Because the states of the three switches do not identically correspond to the three switches of the conventional mouse, and because of the ability to decouple the motion of the present mouse from motion of the on-screen pointer, compensation must occur either in software or hardware. In the former case, special driver software may be utilized. In the latter case, the circuitry 26 for example includes logic elements and provides an output to the computer which mimics that of the conventional 3-button hand-operated mouse. This hardware alternative has the advantage of compatibility with existing mouse drivers and allows interchange of the present mouse with a conventional mouse.

For example, with reference to the aforementioned MSC Technologies, Inc. protocol, the terms $S_1$, $S_2$ and $S_3$ shall herein designate the three switches of a conventional MSC protocol mouse. In the five-byte signal sent to the computer, three bits of the first byte in a group correspond to the respective states of the three switches. The majority of the remaining bits transmit X and Y motion information from the mouse encoders with a few bits being unused. Accordingly, the following table illustrates the signal information sent to the computer by an exemplary embodiment of the present mouse as shown in FIG. 1 with internal compensation in terms of the corresponding signal of a conventional MSC mouse:

| Switch State of Mouse 10 | | | Signal to Computer | | | |
| --- | --- | --- | --- | --- | --- | --- |
| 28a | 28b | 36 | Motion | $S_1$ | $S_2$ | $S_3$ |
| d | d | d | yes | u | u | u |
| u | d | d | yes | d | u | u |
| d | u | d | yes | u | d | u |
| d | d | u | yes | u | u | d |
| u | u | d/u | no | u | u | u |

In the table the letter "d" indicates that a switch (and its corresponding button) is engaged or depressed into a down state and "u" indicates an up (disengaged) state. For example, as shown in the first row of the body of the table, when the switches 28a, 28b and 36 of mouse 10 are all in a down state, the output signal to the computer corresponds to that of a standard MSC protocol mouse with its three switches in the up state. Additionally, motion information from the encoders is included in the signal to the computer. However, as is shown in the last row of the table, when the switches 28a and 28b are both in an up state, regardless of the state of switch 36, no motion information is included in the signal to the computer even if the mouse is being moved. In this case the logic elements provide, over the appropriate bits, a signal corresponding to a stationary MSC mouse with all buttons in an up state. It is a matter of choice as to which combinations of the states of switches 28a and 28b correspond to the signals for the switches $S_1$, $S_2$ and $S_3$. Preferably, the compensation is chosen so that with both switches 28a and 28b depressed, the associated switch function of the conventional mouse corresponds to the most commonly used function (typically that of the left button in a hand-operated mouse).

Figure 21:
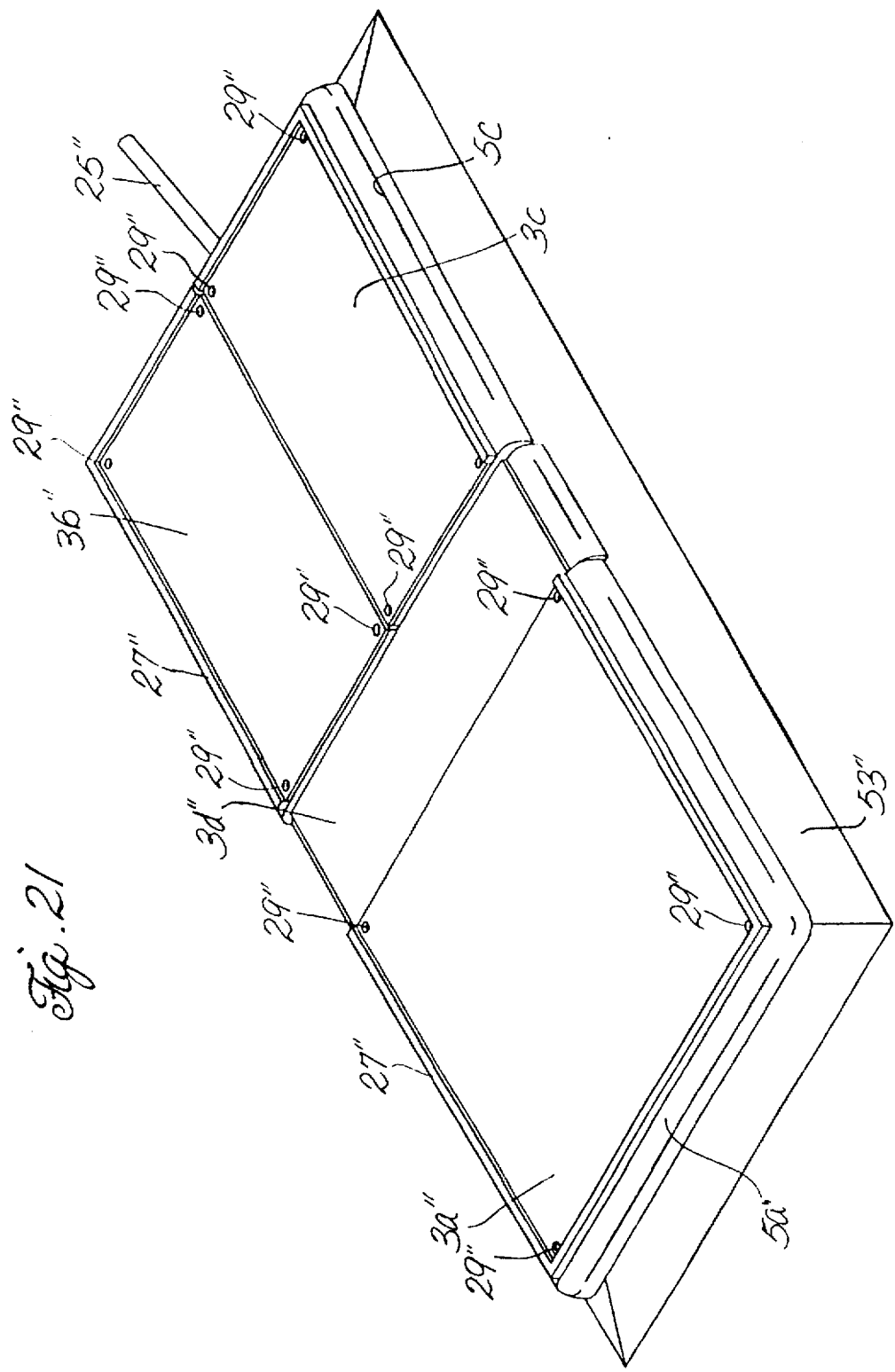
FIG. 21 is an isometric illustration of a fifth embodiment of a foot-operated joystick type computer input device having three switch buttons according to the principles of the present invention.

Turning to FIG. 21, a foot-operated joystick embodiment of the computer input device is shown. Similarly, to the mouse embodiment, the joystick device provides position data to a computer as well as command inputs by actuating one of three switch actuation surfaces 5a", 5b" and 5c".

Figure 22:
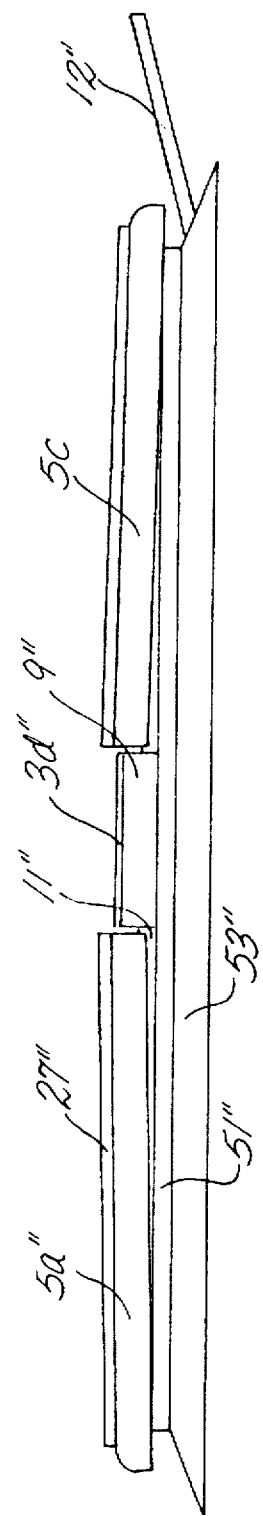
FIG. 22 is a left-side view of the device of FIG. 21.
Figure 23:
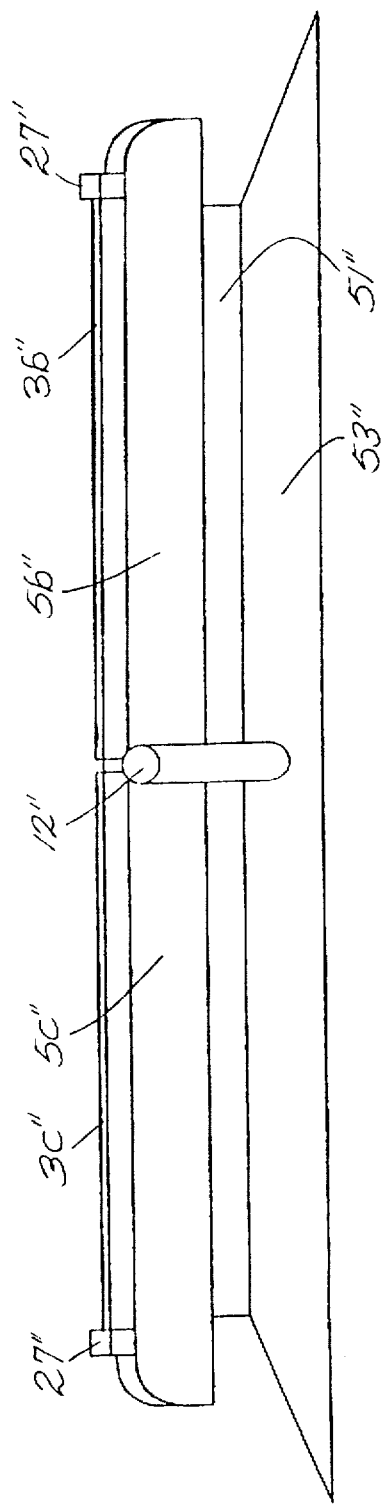
FIG. 23 is a front view of the device of FIG. 21.
Figure 25:
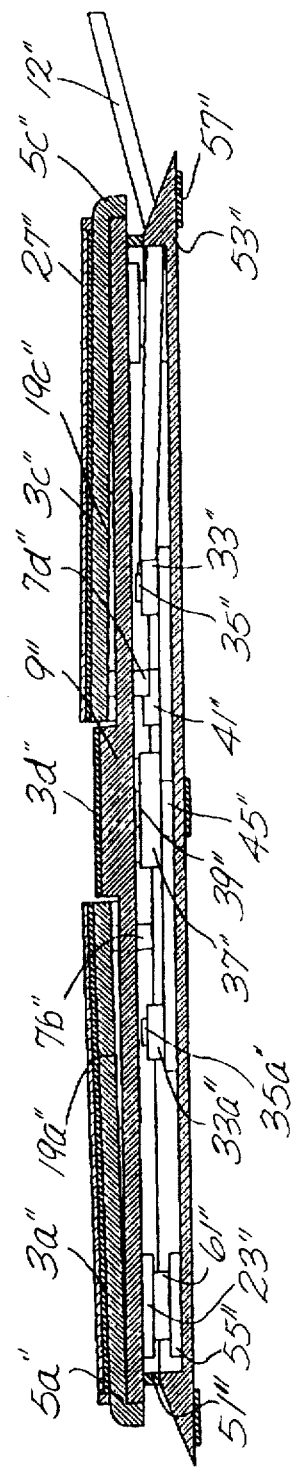
FIG. 25 is a cutaway side view of the device of FIG. 21.
Figure 27:
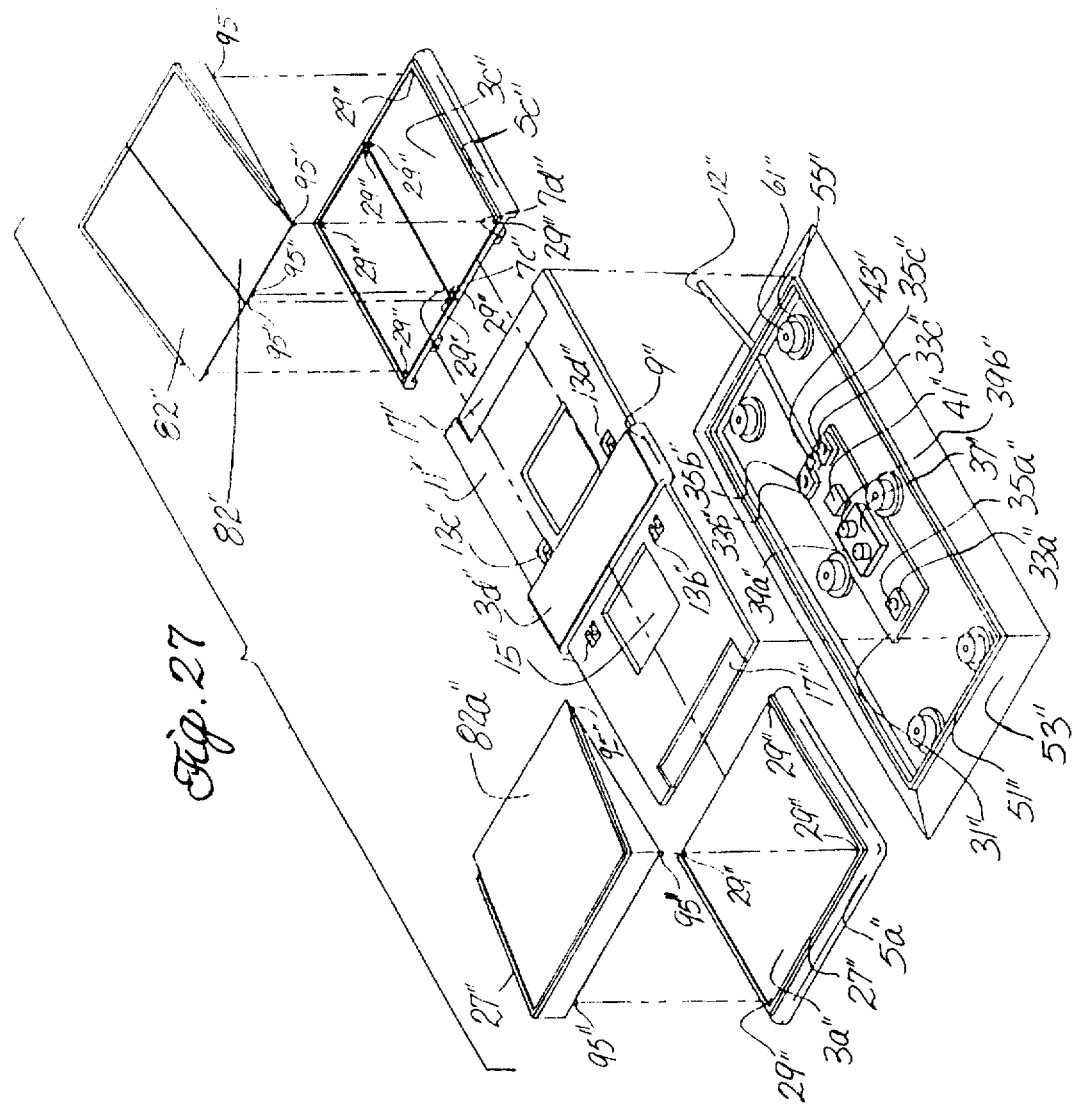
FIG. 27 is a partially exploded view of the device of FIG. 21 fitted with said switch button wedges.

The switch actuation surfaces may be provided with a high friction material 3a", 3b" and 3c" and a ridge 27" formed around the periphery to enhance the user in his or her foot orientations on the device. The actuation of the switches is identical to that disclosed in the foot-operated mouse embodiment and reference is made thereto for a detailed description. The foot-operated joystick embodiment may also be fitted with wedges 82 as shown in FIGS. 25 and 27. Referring to FIGS. 22 and 23, the upper plate 11" is coupled to the base 53" by a resilient material 51" disposed along the periphery of the base. The resilient material 53" allows the upper plate 11" to be moved with a foot relative to the base 53" for producing position data to a computer indicative of said movement. The resilient material also provides a seal for protecting the inside of the foot-operated input device from contamination.

Figure 24:
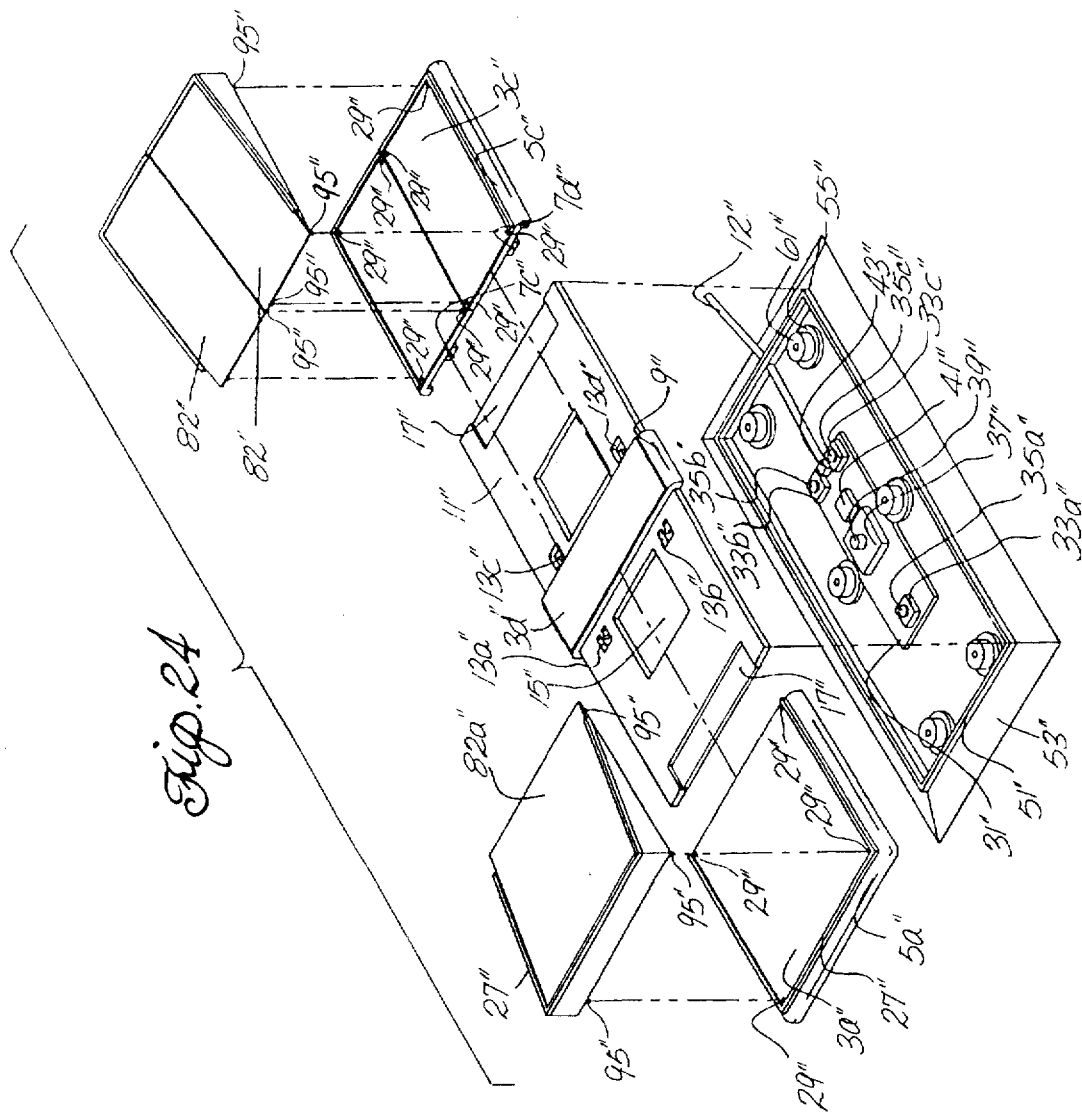
FIG. 24 is a partially exploded view of the device of FIG. 21, fitted with switch button wedges to put the ankle in a natural position irrespective of shoe configuration.
Figure 28:
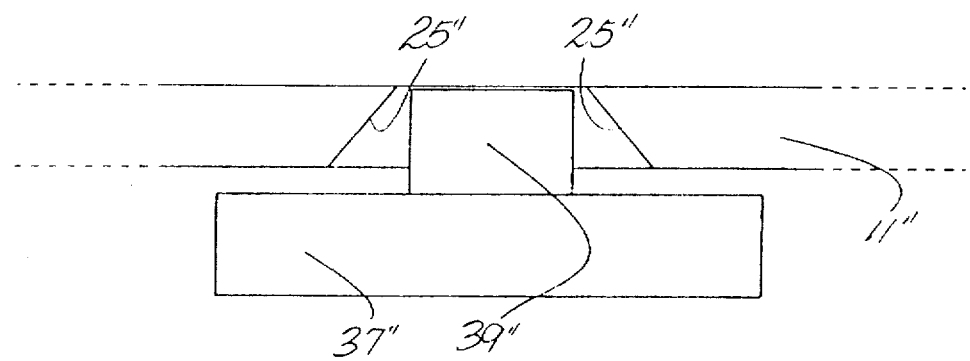
FIG. 28 is a cutaway side view of the device of FIG. 21, depicting the motion sensor in a neutral state.
Figure 29:
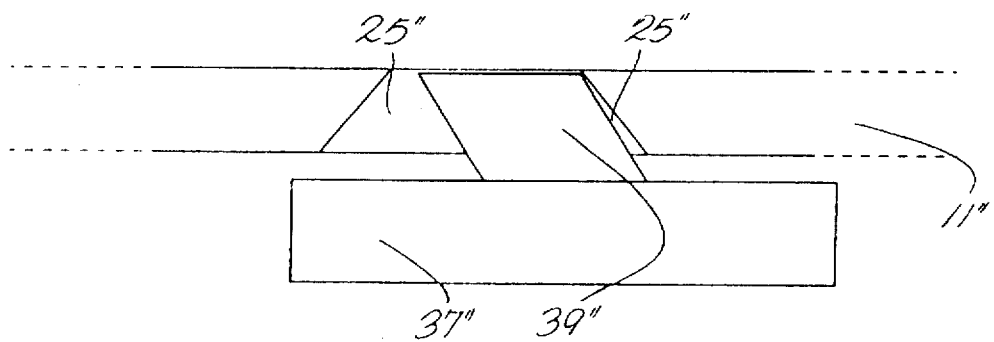
FIG. 29 is a cutaway side view of the device of FIG. 21 depicting a motion sensor when a forward force is applied to the platform.

Referring to the exploded view of FIG. 24, movement of the upper plate 11" relative to the base 53" is detected by motion sensor 39" which is installed in housing 37" and mounted onto circuit board 31". The motion sensor 39" is a small joystick device well known in the art such as, for example, an IBM Trackpoint II System. Referring to FIGS. 28 and 29, the upper plate 11" includes a recess with sloping walls 25", designed to hold the motion sensor 39" and force it to move as the upper plate moves. The sloping walls 25" give the motion sensor 39" room to flex. Six resilient supports 61" are shown in FIG. 24 located adjacent each corner of the base 53" and along each elongated side of the base, 53" in a longitudinally central position. The resilient supports 61" further provide a resilient biasing means for biasing and supporting the upper plate in a neutral position when an external force applied by a foot is not present. Referring to FIG. 24, the resilient supports 61" are held in place by a lower boss 55" which is glued or bonded to a lower surface of the base 53" and an upper boss 23" glued or bonded to a bottom surface of the upper plate. Alternatively, a resilient material 99 may be disposed between the upper plate 11" and the base 53" as shown in FIG. 32. Exemplary of such a material would include a polyurethane foam or the like.

FIGS. 27 and 30 depicts an embodiment of the present invention employing two motion sensors 39a" and 39b" installed into a housing 37" and mounted onto circuit board 31". The two motion sensor configuration allows for detection of rotation of the upper plate 11" with respect to the base 53". For example, referring to FIG. 30, a clockwise rotation of the upper plate 11" causes motion sensor 39a" to flex towards the left side of the housing 37" and causes motion sensor 39b" to flex towards the right side of the housing. A microprocessor or other logic circuitry 41" translates raw data from the motion sensors to representative signals for input to the computer. The input to the computer can be a customized protocol or alternatively a modification of the aforementioned MSC Technologies, Inc. protocol. The modification can be as simple as alternatively transmitting the XY position data using the standard MSC protocol wherein the sync byte is modified to indicate which motion sensor is being sampled. The mouse driver can be programmed to recognize the relative motions of the two motion sensors to indicate a clockwise rotation of the upper plate 11". Conversely, when motion sensor 39a" flexes towards the right side of the housing 37" and motion sensor 39b" flexes towards the left side of the housing 37", the microprocessor or other logic circuitry 41" generates a protocol in which the programed stored in the mouse driver will interpret as a counterclockwise rotation of the upper plate 11" relative to the base. This rotational capability of the dual motion sensor embodiment is particularly useful in game applications where a player may wish to scan his environment a full 360° with or without other movement.

Figure 26:
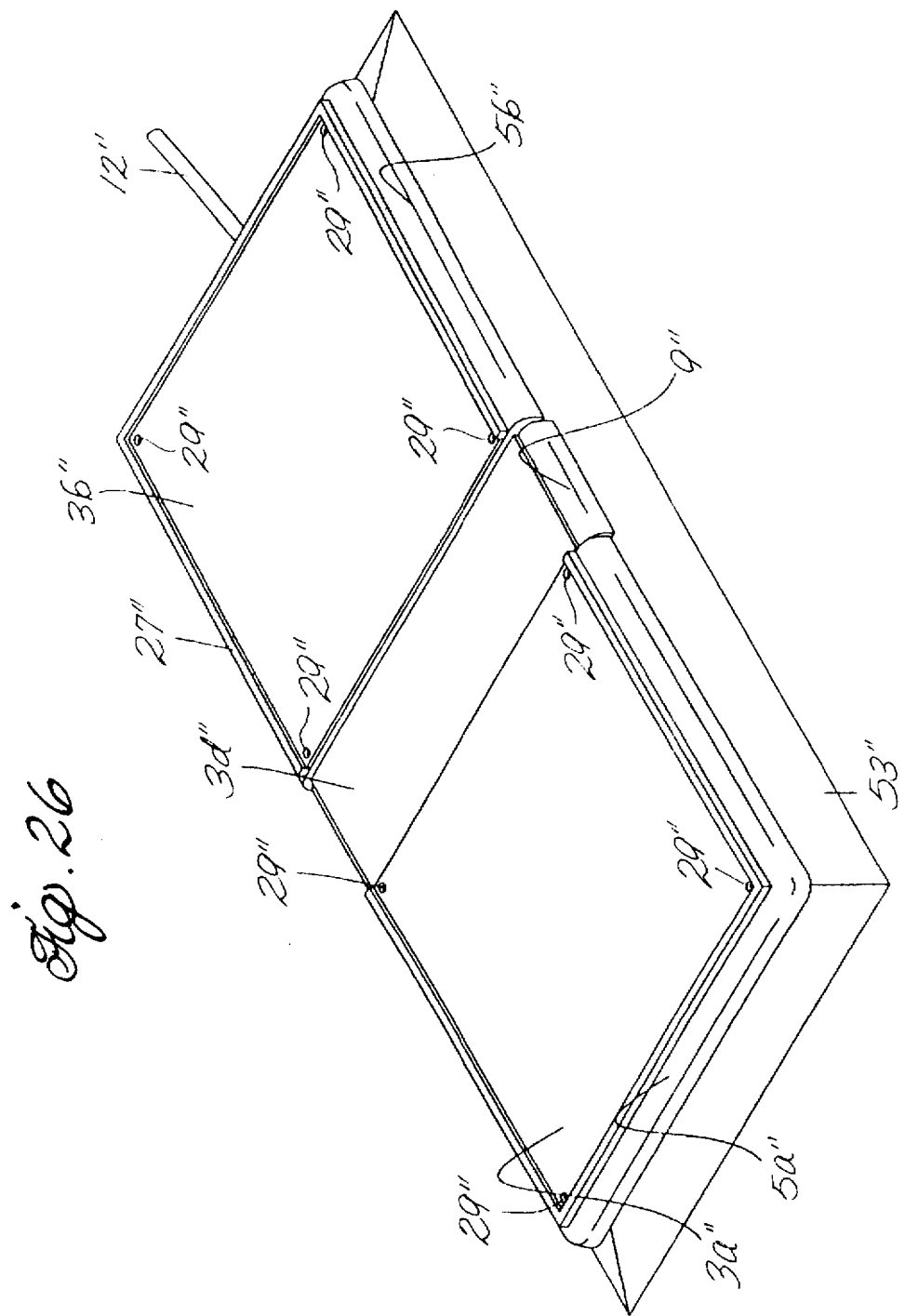
FIG. 26 is an isometric illustration of a fifth embodiment of a foot-operated joystick type computer input device having two switch buttons according to the principles of the present invention.

Similarly to the foot-operated mouse, it will be understood by one skilled in the art that the joystick embodiment described above can be embodied in a device having a heel switch actuation surface 5a" and a front switch actuation surface 5b" as shown in FIG. 26. All the features of the three switch embodiments are disclosed above and reference is made thereto for a detailed description.

Turning to FIGS. 9 and 10, a foot-operated track ball embodiment 110 of the computer input device is shown. Similarly to the mouse embodiment 10, the track ball may be connected to a computer via wiring 112. The track ball has a housing which includes an upward facing platform portion 114 and a base portion 116. As is shown in FIG. 10, the platform portion is inclined slightly relative to the base portion to optimize the angle between a user's foot and leg.

In distinction to the mouse embodiment wherein the device senses movement of the housing and foot as a unit, the track ball embodiment senses movement of the foot relative to the housing. Whereas the mouse's ball 18 extends through the base 16 of the mouse housing, the ball 118 of the track ball device extends through the platform portion 114 for engaging the user's foot.

As is shown in FIG. 9, the device additionally includes left side and right side switches 122a and 122b including elongate longitudinally extending buttons or cover pieces 124a and 124b, respectively. The left and right switches are engageable with left and right portions of the foot when the ball engages the foot.

Additionally, the device may be provided with a left front and a right front switch, 126a and 126b, having cover pieces 128a and 128b, said left and right front switches located forward of the ball 118 adjacent the forward edge of the device.

As is shown in FIG. 10, to facilitate handling and storage, the track ball device may be formed in a folding embodiment. Specifically, the housing is formed in a forward section 140 and a rear section 142 which is moveable relative to the forward section. An operational position of the forward and rear sections is shown in solid lines in FIG. 10 wherein the platform portions of the forward and rear sections are substantially continuous for receiving and supporting the user's foot. In a storage position indicated by the phantom line showing of the rear section 142, the platform portion of the rear section lies substantially atop the platform portion of the forward section with the ball 118 extending through the platform portion of the forward section and being received by a recess 144 in the platform portion of the rear section. The forward and rear sections are hinged to permit the folding or may be interlocked in any appropriate manner such as by interfitting pins and sockets.

In a preferred mode of operation of the track ball embodiment, input signals are provided to the computer by placing the user's foot atop the track ball and controlling the position of an on-screen pointer by moving the foot over the track ball device so as to rotate the ball 118, the position of the pointer being coupled to the rotation of the ball. Command input may be provided to the computer by the pressing, with the foot, any of the front or side buttons/switches. These various buttons may be associated with various functions in a method similar to the buttons of a conventional hand-operated track ball or other input device. As an alternative to or addition to the switches which are located on the main housing of the track ball adjacent the platform portion, as shown in FIG. 7, a secondary housing portion containing button/switches 106 may be provided. The secondary housing and switches are connected to the main housing via wiring 104. The presence of the secondary housing permits the user to utilize his or her other foot to provide the command input information.

Although the foot-operated mouse of the present invention is shown as having a two or three button hand-operated mouse, a version with a single button may be provided which in a similar fashion simulates a one button hand-operated mouse.

Many different types of switch configurations may be used in conjunction with the present invention. A simple switch might have an on condition (continuity) in a depressed state while having an off condition in an undepressed state. With a minor change in the operating software (the "mouse driver") an opposite type of switch might be used. Furthermore, other types of switches, pressure sensors or devices for providing electric input, may be used with appropriate software. It is in this vein that the broad language referring to the "switch state" has been used heretofore. Additionally, the switch input for altering the mouse mode and providing the command input information may be provided by the computer keyboard. This may be as an alternative or compliment to switch input from the mouse.

It is further noted that a variety of sensing means may be used in place of the illustrated ball and inclined axis encoder mechanisms. For example, as an alternative to the mechanical mouse an optical mouse may be employed. The optical mouse uses a light beam to detect movement across a patterned mouse pad. The advantage of using optical technology is that no moving parts are involved and therefore results in increased reliability and reduced maintenance. Similarly, although the illustrated embodiments are presented as hardwired to the computer, alternative means for delivering the input information to the computer are available, including, for example, an infrared link. Additionally, the mouse may be provided with a number of means for helping to secure it to the user's foot. These may include providing the platform portion with a roughened texture, an elastomeric coating, a strap to engage the user's foot or other means.

Although an exemplary shape and exemplary dimensions have been given for the input device, other elongated shape, and varying dimensions are possible, constrained by the size and shape of a typical user's foot. Preferably the size is at least six inches long by three inches wide to accommodate a user's foot.

The principles, preferred embodiments and modes of operation of the present invention have been described in the foregoing specification. The invention which is intended to be protected herein, however, is not to be construed as being limited to the particular forms disclosed, since these are to be regarded as illustrative rather than restrictive. Variations and changes may be made by those skilled in the art without departing from the spirit of the invention. Thus the scope of the invention should be determined by the appended claims and their legal equivalents, and not limited to the examples given.

What is claimed is:

1. A foot-operated input device for providing input information to a remote computer, comprising:

a housing comprising on opposite sides a base for positioning on a support surface and an elongated platform on which a foot is positioned, [the platform being movable in and biasing means for biasing said platform to a neutral position relative to said base when the pressure from said foot is removed, said platform being movable from the neutral position in any radial direction parallel to the base, and movable in any tilting direction toward the base around the neutral position; and sensing means for sensing the movement of the platform in said any radial and tilting direction relative to the base for producing input information indicative of said movement to the computer.

2. The foot-operated input device of claim 1 wherein the biasing means comprises a plurality of resilient supports.

3. The foot-operated input device of claim 2 wherein the resilient supports are spaced at a plurality of locations away from and around the center of the platform.

4. The foot-operated input device of claim 3 wherein said platform is rectangular comprising corners at which sides intersect and said plurality of resilient supports comprise an individual resilient support located adjacent each said corner and an individual said resilient support located adjacent each side of the platform that extends along the elongation thereof.

5. The foot-operated input device of claim 1 further comprising at least one switch, each of said at least one switch having a switch actuation surface facing away from the platform for engagement with the foot when the foot is supported by the platform.

6. The foot-operated input device of claim 1 wherein the sensing means is responsive to rotational movement of the platform.

7. A foot-operated input device for providing input information to a remote computer, comprising:

a housing comprising on opposite sides a base for positioning on a support surface and an elongated platform on which a foot is positioned, the platform being movable relative to the base under pressure by the foot, and biasing means adjacent a periphery of the platform for biasing and supporting said platform to a neutral position relative to said base when the pressure from said foot is removed, said biasing means comprising a resilient material located between the base and the platform, said resilient material covering substantially an entire bottom surface of said platform; and sensing means for sensing movement of the platform relative to the base for producing input information indicative of said movement to the computer.

8. A foot-operated input device for providing input information to a remote computer, comprising:

a housing comprising on opposite sides a base for positioning on a support surface and an elongated platform on which a foot is positioned, the platform being movable relative to the base under pressure by the foot, and biasing means adjacent a periphery of the platform for biasing and supporting said platform to a neutral position relative to said base when the pressure from said foot is removed;

sensing means for sensing movement of the platform relative to the base for producing input information indicative of said movement to the computer; and wherein said biasing means comprises a resilient material between the platform and base and around the periphery of said sensing means.

9. A foot-operated input device for providing input information to a remote computer, comprising:

a housing comprising on opposite sides a base for positioning on a support surface and an elongated platform on which a foot is positioned, the platform being movable in both a parallel and tilting direction relative to the base under pressure by the foot, and resilient biasing means adjacent a periphery of the platform for biasing said platform to a neutral position relative to said base when the pressure from said foot is removed;

sensing means for sensing the movement of the platform in both the parallel and tilting direction relative to the base for producing input information indicative of said movement to the computer; and at least one switch, each of said at least one switch having a switch actuation surface facing away from the platform for engagement with the foot when the foot is supported by the platform.

10. A foot-operated input device for providing input information to a remote computer, comprising:

a housing comprising on opposite sides a base for positioning on a support surface and an elongated platform on which a foot is positioned, the platform being movable in each of a rotational, parallel and tilting direction relative to the base under pressure by the foot, and resilient biasing means adjacent a periphery of the platform for biasing said platform to a neutral position relative to said base when the pressure from said foot is removed; and sensing means for sensing said rotational, parallel and tilting movement of the platform relative to the base for producing input information indicative of said movement to the computer.

11. A foot-operated input device for providing input information to a remote computer, comprising:

a housing comprising on opposite sides a base for positioning on a support surface and an elongated platform on which a foot is positioned, the platform being movable relative to the base under pressure by the foot; and means for producing input information indicative of said movement to the computer comprising two motion sensors for sensing rotational movement of the platform relative to the base.

12. The foot-operated input device of claim 11 wherein the two motion sensors comprise joysticks.

13. The foot-operated input device of claim 11 wherein the two motion sensors are responsive to movement of the platform in a parallel direction to the base.

14. The foot-operated input device of claim 11 wherein the two motion sensors are responsive to pivotal movement of the platform.

15. The foot-operated input device of claim 11 further comprising at least one switch, each of said at least one switch having a switch actuation surface facing away from the platform for engagement with the foot when the foot is supported by the platform.

16. A foot-operated input device for providing input information to a remote computer, comprising:

a housing comprising on opposite sides a base for positioning on a support surface and an elongated platform on which a foot of a user is positioned, the platform being movable in both a rotational direction parallel to the base and a tilting direction toward the base under pressure by the foot, and biasing means for biasing the platform to a neutral position relative to the base when the pressure from the foot is removed; and sensing means for sensing the rotational and tilting movement of the platform relative to the neutral position for producing input information indicative of said movement to the computer.

17. The foot-operated input device of claim 16 wherein the biasing means acts against the rotational movement of the platform.

18. The foot-operated input device of claim 16 wherein the biasing means comprises a resilient material located between the base and the platform, said resilient material covering substantially an entire bottom surface of said platform.

19. The foot-operated input device of claim 16 wherein the biasing means comprises a plurality of resilient supports.

20. The foot-operated input device of claim 19 wherein the resilient supports are spaced at a plurality of locations away from and around the center of the platform.

21. The foot-operated input device of claim 20 wherein said platform is rectangular comprising corners at which sides of the platform intersect and said plurality of resilient supports comprise individual said resilient supports located adjacent each said corner and an individual said resilient support located adjacent each side of the platform that extends along the elongation thereof.

22. The foot-operated input device of claim 16 wherein the biasing means further comprises a foam rubber or plastic resilient material between the platform and the base and around the periphery of said sensing means.

23. The foot-operated input device of claim 16 wherein said platform further comprises a front portion for receiving a foreportion of the foot and a rear portion for receiving a heel portion of the foot, and wherein said input device further comprises means adjacent the front and the rear portion of the platform for enhancing the user's control of the input device.

24. The foot-operated input device of claim 23 wherein the means for enhancing comprises a ridge.

25. A foot-operated input device for providing input information to a remote computer, comprising:

a housing comprising on opposite sides a base for positioning on a support surface and an elongated platform on which a foot of a user is positioned, the platform being movable relative to the base under pressure by the foot, and biasing means for biasing the platform to a neutral position relative to the base when the pressure from the foot is removed;

sensing means for sensing rotational movement of the platform relative to the neutral position for producing input information indicative of said movement to the computer; and at least one switch, each of said at least one switch having a switch actuation surface facing away from the platform for engagement with the foot when the foot is supported by the platform.

* * * * *